US009401073B2

(12) United States Patent
Lee et al.

(10) Patent No.: US 9,401,073 B2
(45) Date of Patent: Jul. 26, 2016

(54) ELECTRONIC GAMING DEVICE WITH SKILL-BASED TOURNAMENT FUNCTIONALITY

(71) Applicant: Cadillac Jack, Inc., Duluth, GA (US)

(72) Inventors: Sigmund Hyunjai Lee, Atlanta, GA (US); Carmen DiMichele, Norcross, GA (US)

(73) Assignee: Cadillac Jack, Inc., Duluth, GA (US)

( * ) Notice: Subject to any disclaimer, the term of this patent is extended or adjusted under 35 U.S.C. 154(b) by 157 days.

(21) Appl. No.: 13/925,534

(22) Filed: Jun. 24, 2013

(65) Prior Publication Data

US 2014/0378195 A1 Dec. 25, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.

CPC .......... *G07F 17/3276* (2013.01); *G07F 17/329* (2013.01); *G07F 17/34* (2013.01)

(58) Field of Classification Search

USPC ...................... 463/1, 20, 25, 29, 39, 40, 42, 7
See application file for complete search history.

(56) References Cited

U.S. PATENT DOCUMENTS

| | | | | |
|---|---|---|---|---|
| 2002/0039923 | A1* | 4/2002 | Cannon et al. | 463/42 |
| 2004/0029627 | A1* | 2/2004 | Hannan et al. | 463/1 |
| 2005/0043088 | A1* | 2/2005 | Nguyen et al. | 463/29 |
| 2007/0077994 | A1* | 4/2007 | Betteridge | 463/42 |
| 2009/0275374 | A1* | 11/2009 | Nelson et al. | 463/16 |
| 2011/0294561 | A1* | 12/2011 | Shaw | G07F 17/32 463/20 |

* cited by examiner

*Primary Examiner* — Adetokunbo O Torimiro
(74) *Attorney, Agent, or Firm* — Weide & Miller, Ltd.

(57) ABSTRACT

Examples disclosed herein relate to systems and methods utilizing in tournament game play. An electronic gaming device may include a plurality of reels. One or more paylines may be formed on at least a portion of the plurality of reels. The electronic gaming device may include a memory and one or more processors. The memory may include one or more tournament game structures with one or more skill-based tournament game play structures. The one or more processors may initiate the one or more tournaments based on one or more tournament game structures. The one or more tournaments may be at least based in part on one or more skill-based tournament game plays.

15 Claims, 35 Drawing Sheets

FIG. 9A
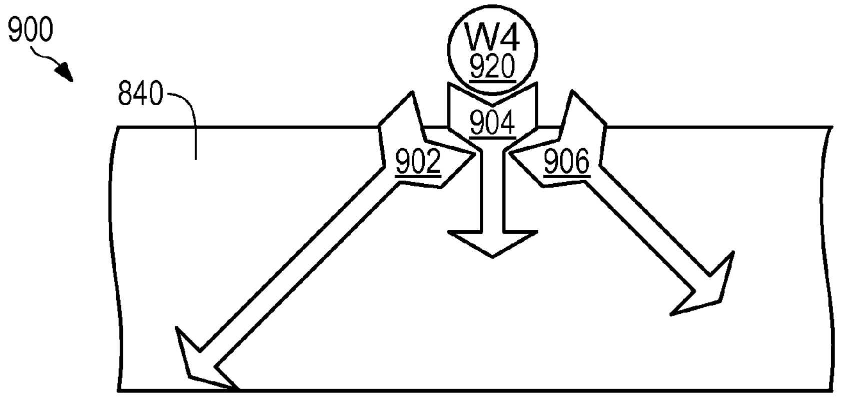
FIG. 9A
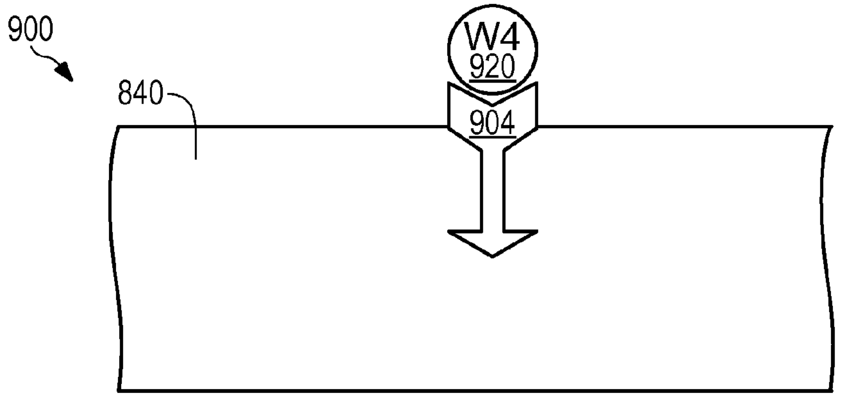
FIG. 9B
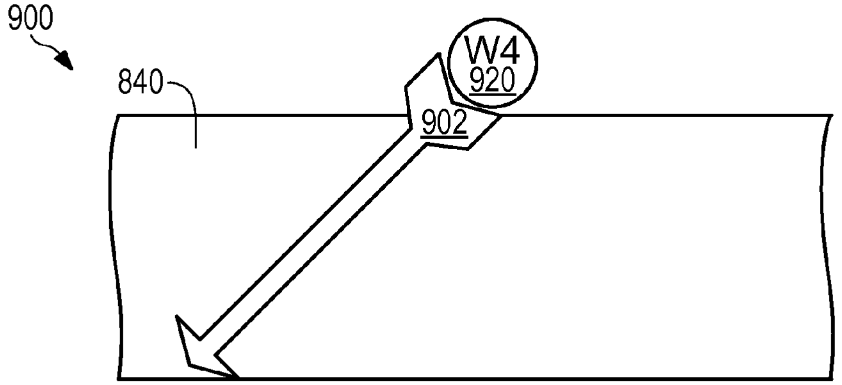
FIG. 9C

1900F

1960

| NAME | TOTAL | DATE PLAYED | PLAYERS LEFT TO PLAY | AVERAGE PLAY |
|---|---|---|---|---|
| Group 1 | 150,000 | Bob S. 1/9/14<br>Kim N. 1/7/14 | (2)<br>Katie V.<br>Lisa J. | 75,000 |
| Group 2 | 125,000 | Jim B. 1/6/14 | (3)<br>Emily A.<br>Mary L.<br>Lou B. | 125,000 |
| Zeta E. | 200,000 | Zeta E. 1/3/14 | N/A | 200,000 |
| ⋮ | ⋮ | ⋮ | ⋮ | ⋮ |
| Group N | 0 | N/A | (4)<br>Mike Z.<br>Dan L.<br>Rob C.<br>B. J. | 0 |

1962 (header row), 1964 (Group 1 row), 1966 (Zeta E. row), 1968 (Group N row)

FIG. 19F

ELECTRONIC GAMING DEVICE WITH SKILL-BASED TOURNAMENT FUNCTIONALITY

FIELD

The subject matter disclosed herein relates to an electronic gaming device. More specifically, the disclosure relates to an electronic gaming device, which provides tournament game play for which players have the ability to utilize skill-based gaming functionalities (e.g., shooting, aiming, strategy, jumping, etc.). Further, the disclosure relates to utilizing the skill-based gaming functionalities in the base game, the bonus game, and/or a tournament game play to enhance the gaming experience.

INFORMATION

The gaming industry has numerous casinos located both worldwide and in the United States. A client of a casino or other gaming entity can gamble via various games of chance. For example, craps, roulette, baccarat, blackjack, and electronic games (e.g., a slot machine) where a person may gamble on an outcome.

Paylines of an electronic gaming device (e.g., a slot machine) are utilized to determine when predetermined winning symbol combinations are aligned in a predetermined pattern to form a winning combination. A winning event occurs when the player successfully matches the predetermined winning symbols in one of the predetermined patterns. One or more combinations of symbols may generate a bonus game. A new way of delivering game play includes providing skill-based gaming functionalities in a tournament game mode, a normal (e.g., base game) mode, and/or a bonus game mode.

BRIEF DESCRIPTION OF THE FIGURES

Non-limiting and non-exhaustive examples will be described with reference to the following figures, wherein like reference numerals refer to like parts throughout the various figures.

FIG. 9A is an illustration of skill-based tournament game play, according to one embodiment.

FIG. 9B is another illustration of skill-based tournament game play, according to one embodiment.

FIG. 9C is another illustration of skill-based tournament game play, according to one embodiment.

FIG. 19F is another illustration of displaying one or more skill-based game play data, according to one embodiment.

DETAILED DESCRIPTION

Figure 1:
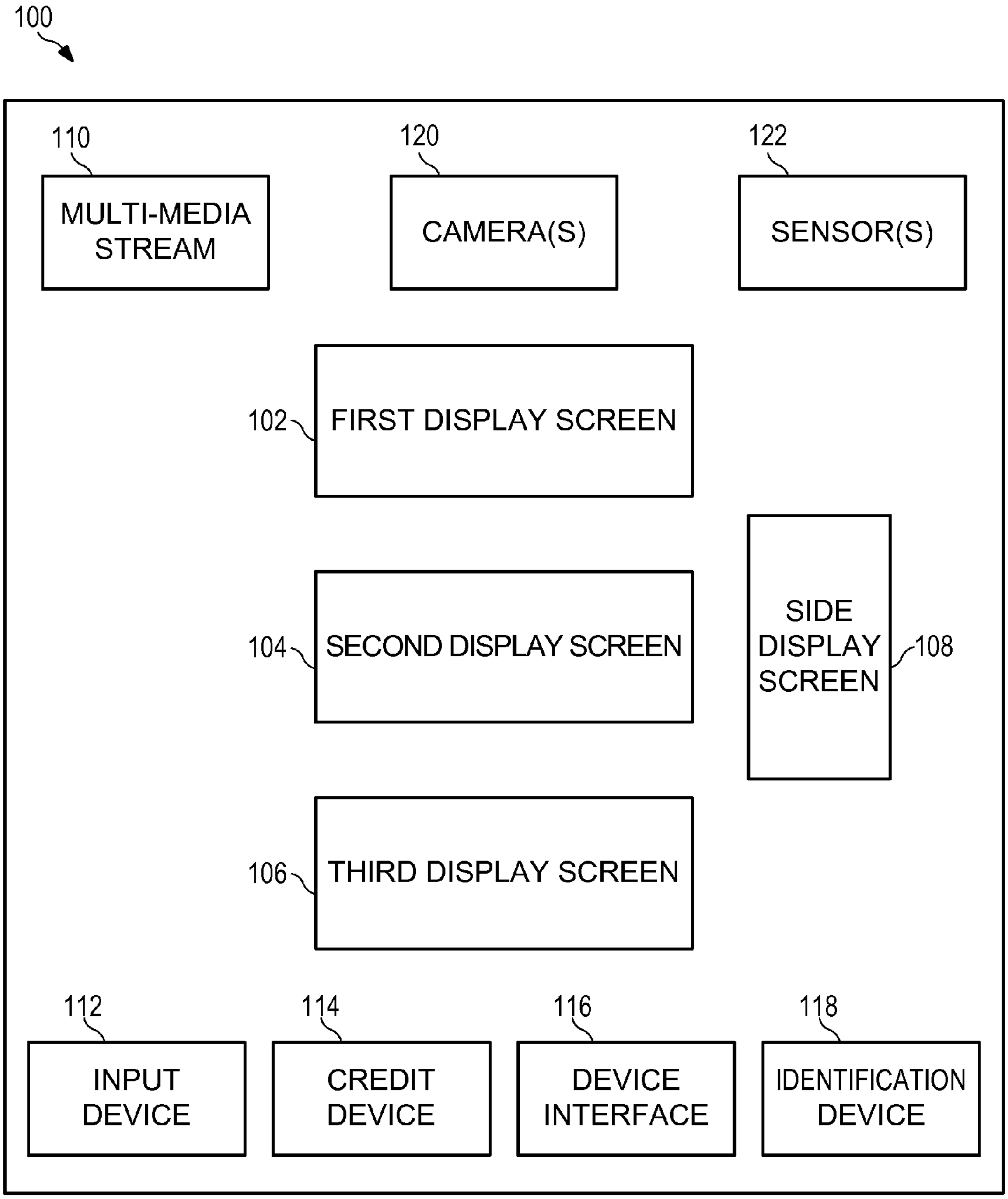
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, an identification device 118, one or more cameras 120, and one or more sensors 122. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to control any object (e.g., one or more skill-based object functionality), to select one or more gaming options (e.g., a base game mode, a bonus game mode, a tournament game mode, etc.), to obtain data relating to historical payouts, to select a row and/or column to move, to select a row area to move, to select a column area to move, to select a symbol to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.).

In one example of a skill-based game play, the player may correctly answer a trivia question to activate one or more functions, to enter a tournament game play, and/or tournament phase. In another example, the skill-based game may be to shoot a virtual ball through a virtual net, shoot a virtual animal, and/or any other skill-based activity, semi-skill-based activity, and/or perceived-skill-based activity. In one example, a semi-skill-based activity may be when a player aims at a target and depending on game conditions one or more processors modifies (e.g., improves) the player's aim to hit the target.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming device 100. Device interface 116 may include an over the air connection by which a mobile device is connected to electronic gaming device 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more tournament game based functionalities may be presented, one or more gaming options (e.g., a base game mode, a bonus game mode, a tournament game mode, etc.) may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have game play which has only a specific game based functionality (or similar functionality). Therefore, no games without the specific game based functionality would be presented. In another example, the player may only want to play games that include pattern gaming options only. Therefore, only games which include pattern gaming options would be presented to the player. In another example, the player may only want to play games that include historical information relating to game play. Therefore, only games which include historical gaming data would be presented to the player.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games and/or secondary (bonus) games, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with second display screen 104, third display screen 106, and side display screen 108. Any combination thereof may be formed.

The presentations associated with tournament game based game play and/or skill-based tournament game based game play may be presented on one, a few, and/or a plurality of screens. These presentations may be displayed on a portion of one, a few, and/or a plurality of these screens.

For example, a single large image could be partially displayed on second display screen 104 and partially displayed on third display screen 106, so that when both display screens are put together they complete one image. Electronic gaming device 100 may stream or play prerecorded multi-media data, which may be displayed on any display combination.

One or more cameras 120 and/or one or more sensors 122 may be utilized as one or more depth image sensing devices, which may be located in various locations, including but not limited to, above the base display, above second display, in one or more locations on gaming cabinet front, on a side of the gaming cabinet other than gaming cabinet front, and/or any other location.

In one embodiment, electronic gaming device 100 may not include separate one or more input devices, but instead may only utilize one or more depth image sensing devices. In another embodiment, a player may utilize one or more input devices and/or may utilize gestures that electronic gaming device 100, via one or more depth image sensing devices, recognizes in order to make inputs for a play of a game. A player may interact with electronic gaming device 100 via one or more depth image sensing devices for a plurality of various player inputs.

In one embodiment, one or more depth image sensing devices may include at least two similar devices. For example, each of the at least two similar devices may independently sense depth and/or image of a scene. In another example, such similar depth image sensing devices may then communicate information to one or more processors, which may utilize the information from each of the similar depth image sensing devices to determine the relative depth of an image from a captured scene.

In another embodiment, one or more depth image sensing devices may include at least two different devices. For example, and discussed in more detail below, one of the at least two different devices may be an active device and/or one of the at least two different devices may be a passive device. In one example, such an active device may generate a wave of measurable energy (e.g., light, radio, etc.). In another example, such a passive device may be able to detect reflected waves generated by such an active device. In another example, such an active device and such a passive device may each communicate data related to their respective activity to a processor, and such processor may translate such data in order to determine the depth and/or image of a scene occurring near electronic gaming device 100.

Figure 2:
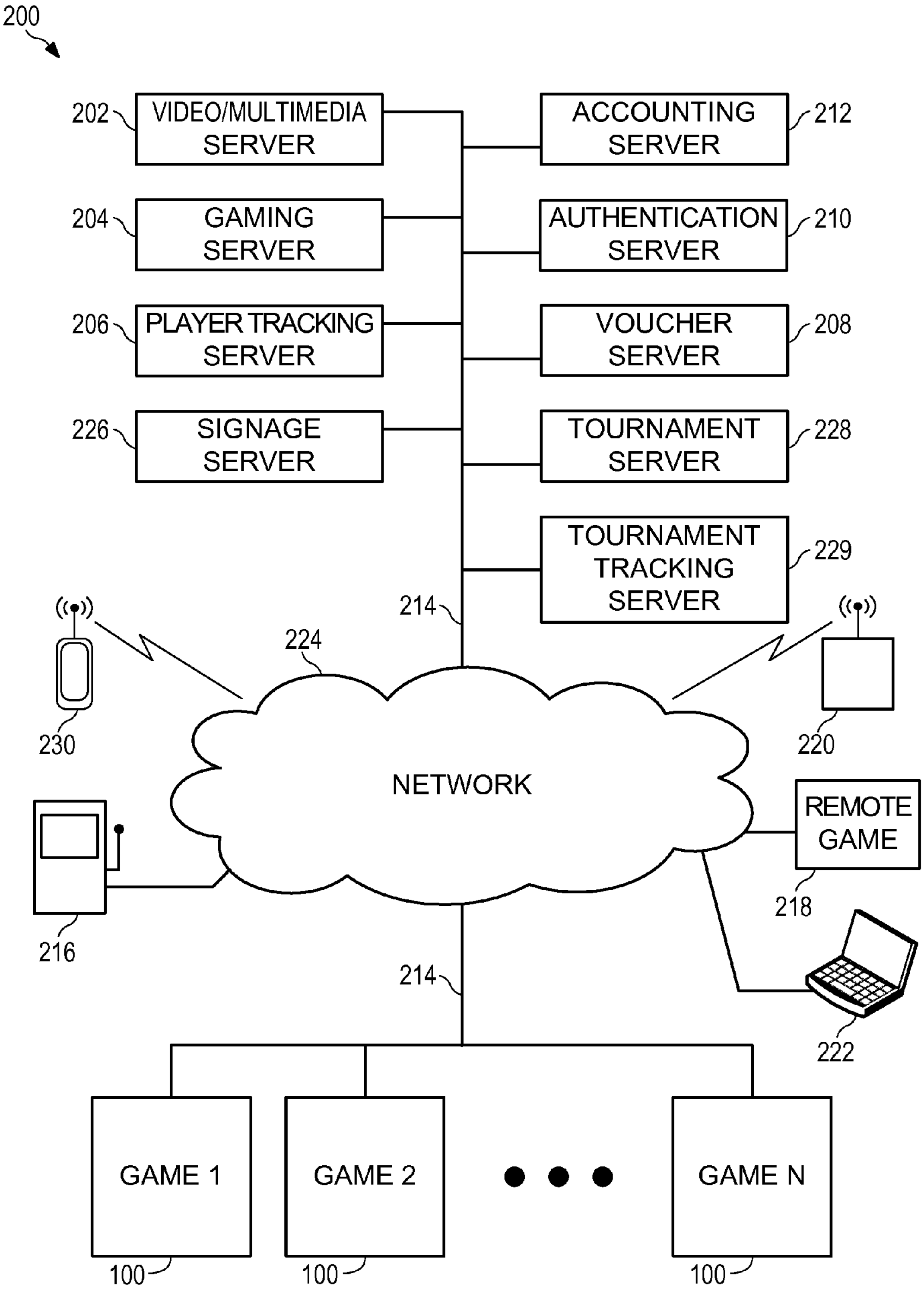
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, an accounting server 212, a signage server 226, a tournament server 228, and a tournament tracking server 229. Tournament server 228 and tournament tracking server 229 may have similar functionalities to tournament module 420, and tournament tracking module 422, respectively.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of a payout functionality, a tournament functionality, a skill-based tournament functionality, a tournament evaluation functionality, a skill-based tournament evaluation functionality, other physical game functionality, and/or any other virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include tournament game based game play data (or similar game play data) and/or skill-based tournament game based game play data (or similar game play data), repeat payline data, pattern data, historical payout data, column data, row data, and/or symbols that were modified. For example, the player's ranking in the tournament and/or skill-based tournament may be displayed on the voucher and/or any other tournament data.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server may be used to maintain data relating to historical game play for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Figure 3:
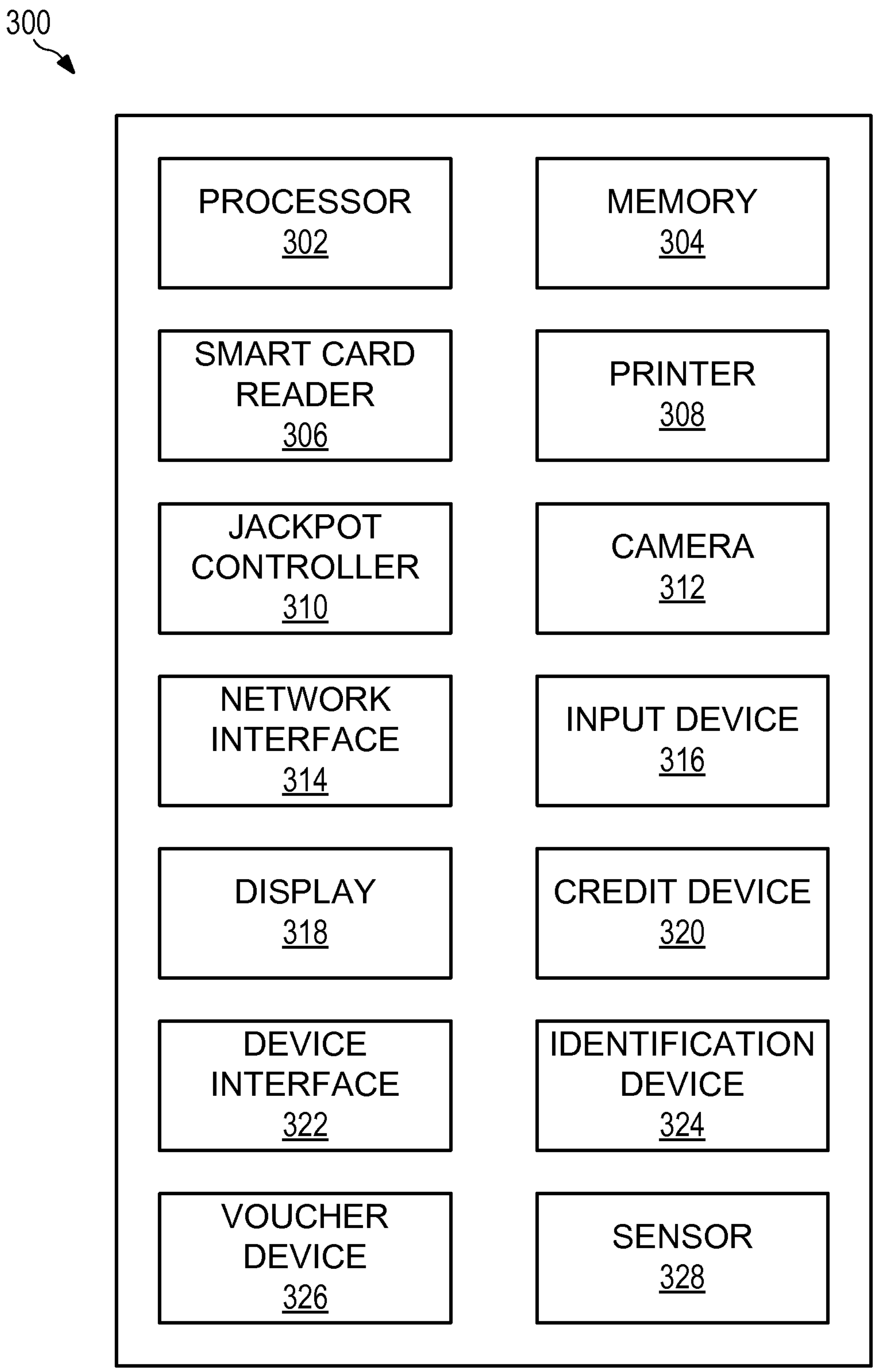
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, a voucher device 326, and a sensor 328.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, and/or any combination thereof. Input device 316 may be utilized to make a wager, to select one or more game elements, to control any object, to select one or more gaming options (e.g., a base game mode, a bonus game mode, a tournament game mode, etc.), to make an offer to buy, sell, and/or trade a voucher, to determine a vouchers worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
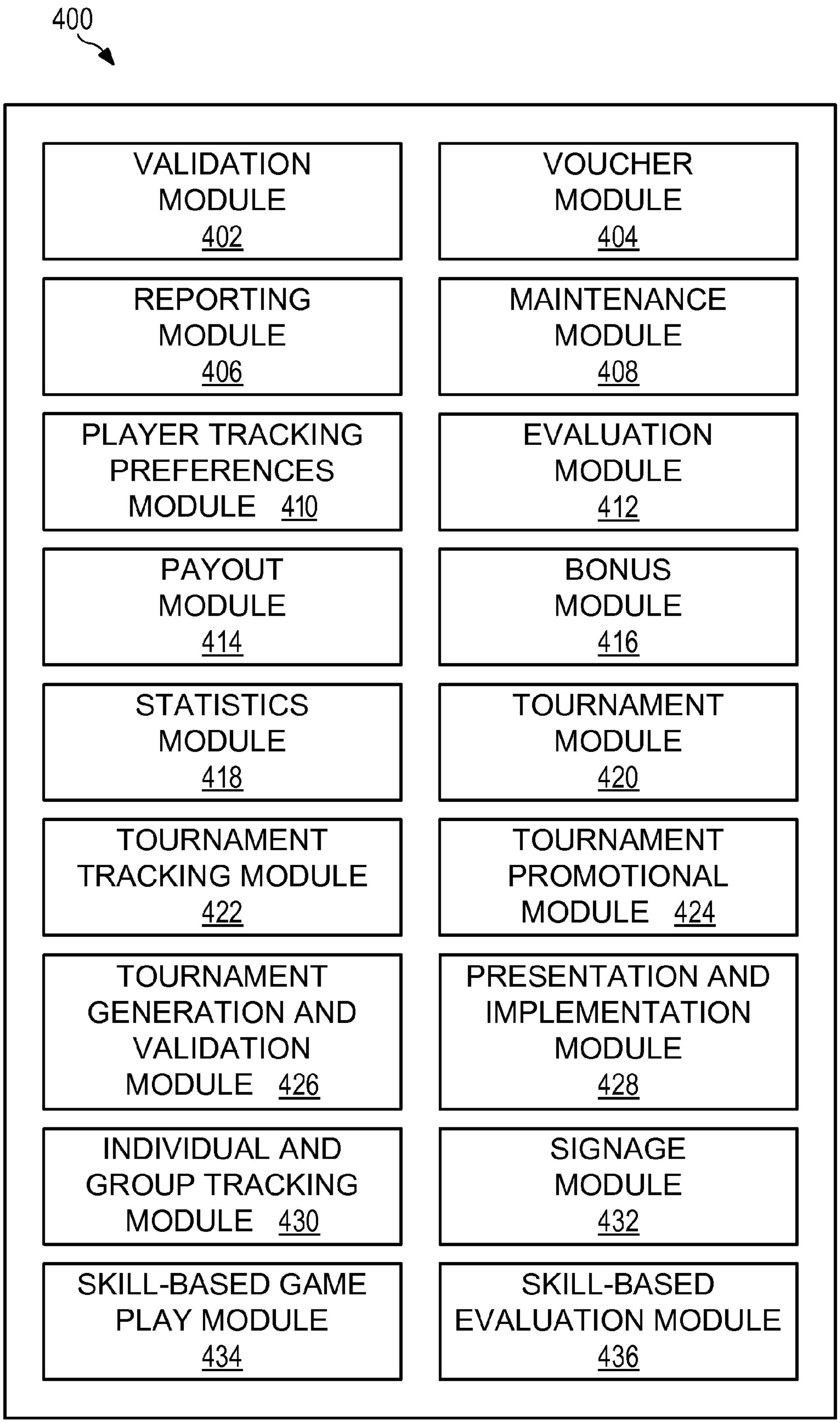
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, an evaluation module 412, a payout module 414, a bonus module 416, a statistics module 418, a tournament module 420, a tournament tracking module 422, a tournament promotional module 424, a tournament generation and validation module 426, a presentation and implementation module 428, an individual and group tracking module 430, a signage module 432, a skill-based game play module 434, and a skill-based evaluation module 436.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance, request a service call based on a device error, and/or any other reason.

Player tracking preferences module 410 may compile and track data associated with a player's preferences.

Evaluation module 412 may evaluate one or more outcomes for one or more events (e.g., base game mode, bonus game mode, tournament mode, skill-based tournament mode, etc.) in one or more gaming options.

Payout module 414 may determine one or more payouts which may relate to one or more inputs received from the player, electronic gaming device 100, and/or electronic gaming system 200.

Bonus module 416 may generate a bonus game, evaluate the results of the bonus game, trigger bonus game presentations, generate bonus game payouts, and/or display any data relating to the bonus game.

Statistics module 418 may generate, compile, transmit, and/or store any statistical data relating to one or more gaming options (e.g., base game mode, bonus game mode, tournament mode, skill-based tournament mode, etc.). For example, game type 1 may generate a return of 125% during normal conditions (e.g., 90% of the time). Whereas, game type 2 may generate a return of 200% but only 75% of the time. In another example, a first advertisement may have generated a click thru rate of 20% and an acceptance rate (e.g., an actual purchase, an acceptance of the offer, etc.) of 15%. In this example, the first advertisement may have been of a first type. Whereas, a second advertisement may have generated a click thru rate of 30% and an acceptance rate of 10%. In this example, the second advertisement may have been of a second type. In addition, a third advertisement (e.g., an advertisement tied to player information) may have generated a click thru rate of 60% and an acceptance rate of 45%. This information may be utilized as a feedback loop to enhance future advertisements. The statistics module may also generate stats based on where in the game play/tournament cycle one or more advertisements are presented. For example, click-through rate ("CTR")/acceptance rate ("AR") for a particular advertisement shown before a tournament begins versus the advertisement being shown while players are waiting for the tournament final results versus the advertisement being shown directly after the tournament.

Tournament module 420 may generate, compile, transmit, and/or store one or more tournament structures. Tournament module 420 may generate, compile, transmit, and/or store data relating to one or more tournaments. Tournament module 420 may generate historical tournament reports. Tournament module 420 may generate new tournament structures based on historical tournament data (e.g., participation rate, prize pool, the level of players that played in the tournament, monies earned from related events, etc.). For example, one or more tournament structures may be targeted to high rollers. Whereas, other tournament structures may be targeted in middle level players. In another example, other tournament structures may be targeted to beginners.

Tournament tracking module 422 may generate, compile, transmit, and/or store data relating to one or more tournament structures. For example, this data may include the participants in one or more tournaments, the success (e.g., participation rate, profit/loss statement, etc.) of one or more tournaments, the individual scores for one or more players, the team scores for one or more teams, the length of time for completing game play for individuals and/or teams, one or more winning histories for individuals and/or teams, tax records for one or more tournaments, the number of game play suspensions (e.g., asynchronous game play mode) initiated by one or more players and/or one or more teams, and/or any other data relating to one or more tournaments.

Tournament promotional module 424 may generate, compile, transmit, and/or store promotional data (e.g., leaderboard, tournament structure, mailings, sponsor data, advertisements, etc.) for one or more tournaments.

Tournament generation and validation module 426 may generate, compile, transmit, and/or store validation data for one or more tournaments. For example, a first player's score may be validated by requesting information for the electronic gaming device, the electronic gaming system, and/or any other device to compare the first player's score to the data within the gaming machine.

Presentation and implementation module 428 may generate the presentation data (e.g., visual and audio) relating to one or more skill-based tournament game play options. A presentation module may display one or more of the generated presentations.

Individual and group tracking module 430 may generate, compile, transmit, and/or store data relating to tournament play for one or more individuals and/or teams. For example, Team Winner has won two out of the last five tournaments that Team Winner played in.

Signage module 432 may be used to generate any image for display on: electronic gaming device 100; an internal display device within a gaming entity; an external display device outside of a gaming entity; one or more devices at one or more satellite locations; one or more mobile devices; one or more Internet sites; and/or any combination thereof. Signage module 422 may utilize data from any module, any other server (e.g., statistics server 418 and/or signage server), and/or any other data source to generate images for display on: electronic gaming device 100; an internal display device within a gaming entity; an external display device outside of a gaming entity; one or more devices at one or more satellite locations; one or more mobile devices; one or more Internet sites; and/or any combination thereof.

Skill-based game play module 434 may generate, compile, store, and/or transmit one or more skill-based structures and/or one or more skill-based tournament structures.

Skill-based evaluation module 436 may evaluation one or more outcomes of one or more skill-based games and/or skill-based tournament games.

It should be noted that one or more modules may be combined into one module. Further, there may be one evaluation module where the determined payout does not depend on whether there were any wild symbols, any scatter symbols, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

Figure 5A:
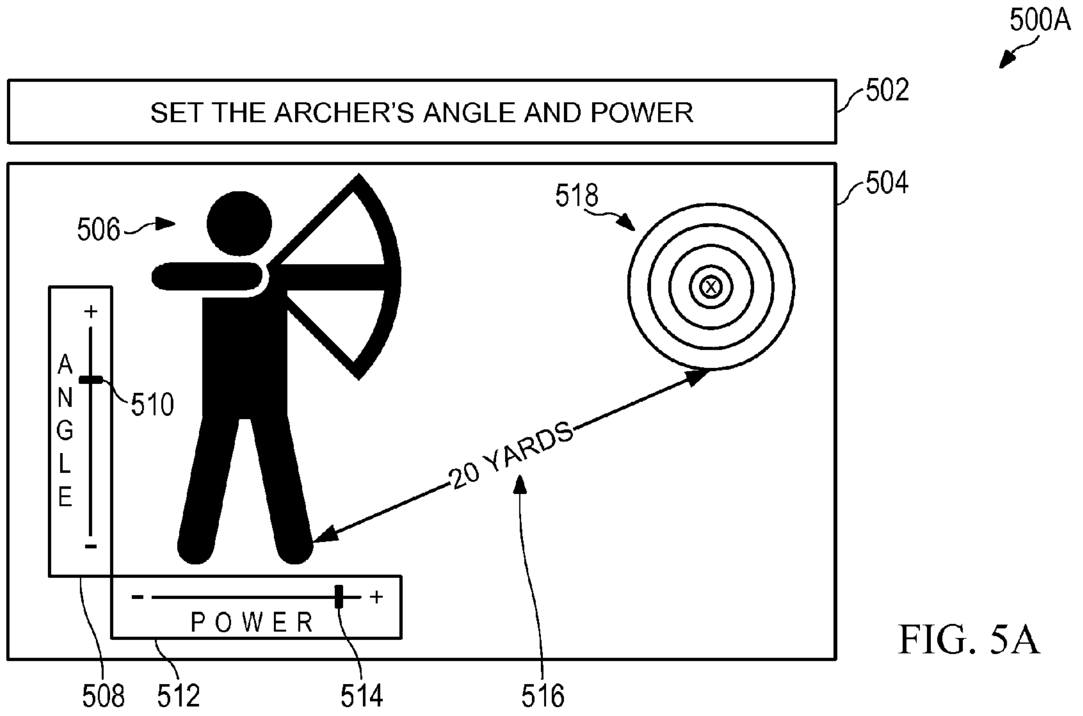
FIG. 5A is an illustration of skill-based tournament game play, according to one embodiment.

In FIG. 5A, an illustration of skill-based tournament game play 500A is shown, according to one embodiment. In this example, the display image may include a message area 502 and a gaming area 504. Message area 502 may include any data relating to tournament game play and/or tournament skill-based game play. For example, message area 502 may include instructions, such as, "Set The Archer's Angle and Power Settings." In another example, a tournament title may be displayed. In an example, the time period remaining in the tournament game play and/or the tournament skill-based game play may be shown. Leader board information and/or other game data and/or player ranking data may be displayed.

In another example, gaming area 504 may include a player icon 506, an angle setting area 508, an angle input indicator 510, a power setting area 512, a power input indicator 514, a distance-to-target indicator 516, and/or a target area 518. In one example, angle setting area 508 is where a player inputs via angle input indicator 510 the angle to utilize to launch an object (e.g., an arrow, etc.). In various examples, the angle input may be modified and/or replaced with a speed input, a strength input, a height input, a length input, a weight input, any other object characteristic input, and/or any combination thereof. In another example, power setting area 512 is where a player inputs via power input indicator 514 a power unit to be utilized with an object (e.g., bow and arrow, etc.). In various examples, the power input may be modified and/or replaced with a distance input, a strength input, a weight input, a range input, a speed input, any other object characteristic input, and/or any combination thereof.

Figure 5B:
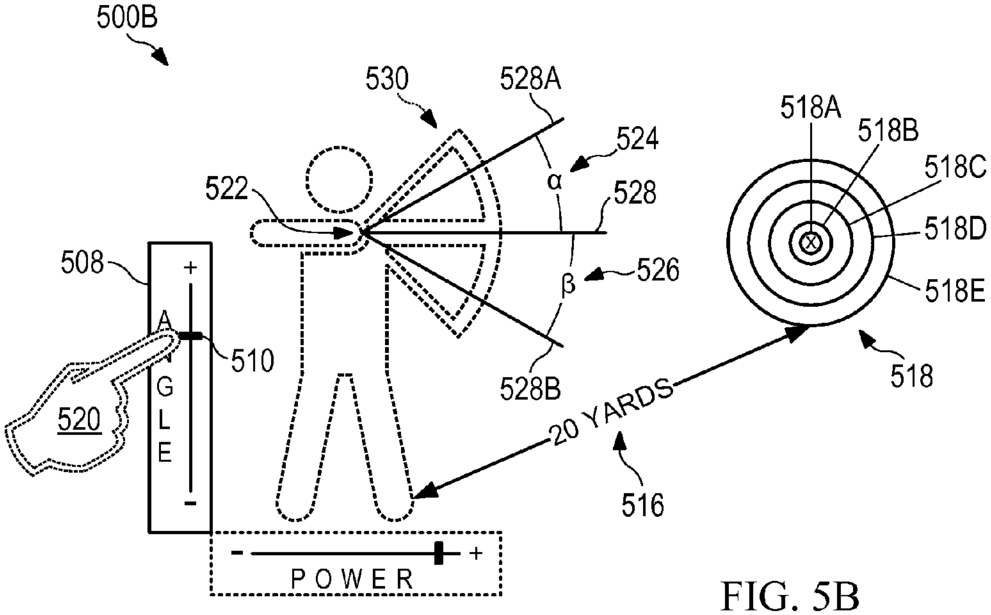
FIG. 5B is another illustration of skill-based tournament game play, according to one embodiment.

In FIG. 5B, another illustration of skill-based tournament game play 500B is shown, according to one embodiment. In one example, player icon 506 may include a reference point 522 along with a bow and arrow image 530. Reference point 522 may be a virtual origin point utilized with player icon 506 and/or any other object utilized with player icon 506. In one example, a representative horizontal line 528 may be utilized with player icon 506 and/or any other object to indicate when an object is horizontal (e.g., at the mid-point of a range, aligned with reference point 522, etc.). In one example, an incline angle 524 indicates that an object is aimed above the horizontal line 528. Whereas, a decline angle 526 indicates that an object is aimed below the horizontal line 528. These angles may be selected via a hand 520 where sliding angle input indicator 510 up may increase the angle and sliding angle input indicator 510 down may decrease the angle. In one example, a maximum incline angle 528A and/or a maximum decline angle 528B may be utilized. In various examples, hitting a bulls eye area 518A may achieve a first award, hitting a first ring area 518B may achieve a second award, hitting a second ring area 518C may achieve a third award, hitting a third ring area 518D may achieve a fourth award, and/or hitting a fourth ring area 518E may achieve a fifth award on a target 518. The first award may be higher than any other award. The second award may be higher than any other award except the first award. The third award may be higher than any other award except the first award and the second award. The fourth award may only be higher than the fifth award and the fifth award may be the lowest award. Any number of targets and/or award areas may be utilized.

Figure 5C:
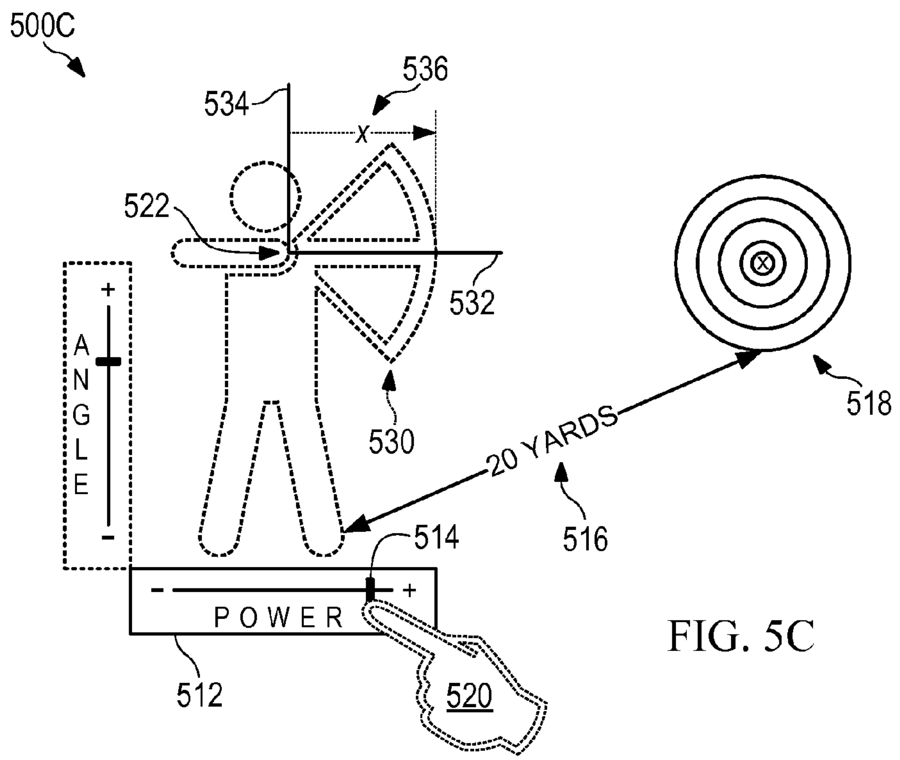
FIG. 5C is another illustration of skill-based tournament game play, according to one embodiment.

In FIG. 5C, another illustration of skill-based tournament game play 500C is shown, according to one embodiment. In one example, a player via hand 520 moves the arrow back to a drawn position length 536 by inputting a power setting in power setting area 512. The combination of the power setting (e.g., amount of power utilized) and the angle setting (e.g., the launch angle) may determine the length, the trajectory, etc. the object (e.g., an arrow, etc.) will travel.

Figure 5D:
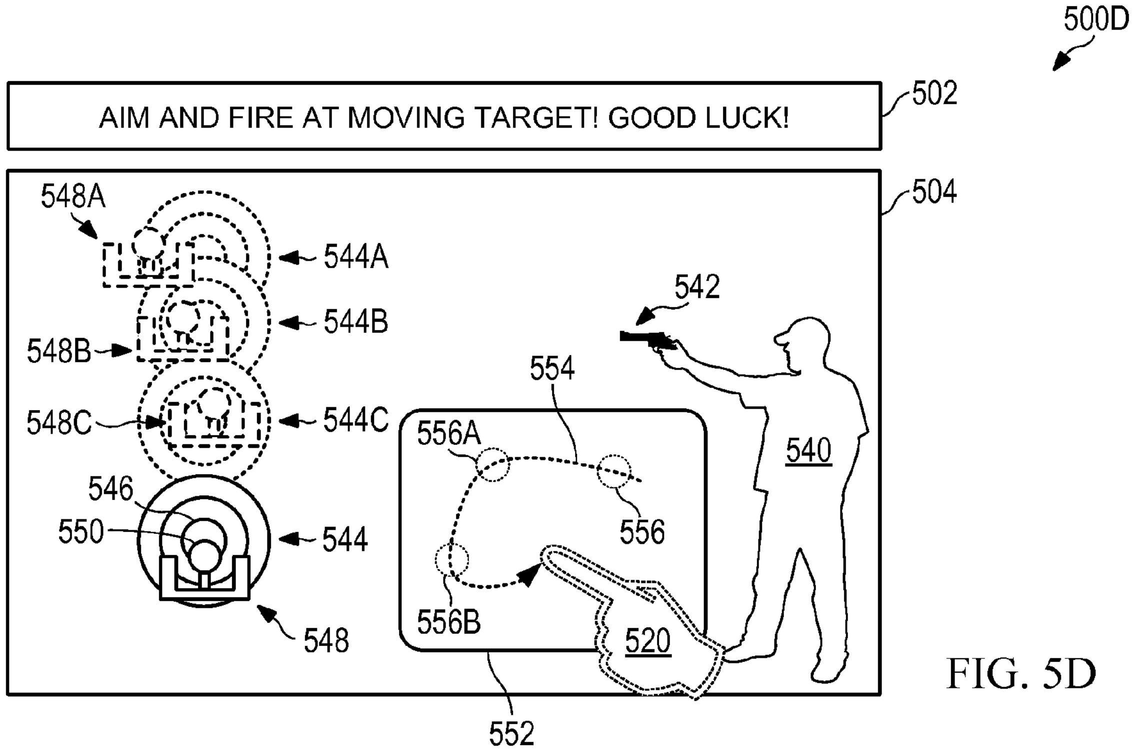
FIG. 5D is another illustration of skill-based tournament game play, according to one embodiment.

In FIG. 5D, another illustration of skill-based tournament game play 500D is shown, according to one embodiment. In this example, message area 502 may state "AIM AND FIRE AT MOVING TARGET! GOOD LUCK!" In this example, a player image 540 may aim a weapon (e.g., gun, tank, bow and arrow, etc.) via an aiming device 542 (e.g., sight of pistol) to hit one or more moving targets (e.g., 544). In this example, one or more targets 544 may have a bull's eye area 546. In this example, a front sight (e.g., a bead type) 550 of the pistol may be utilized to track one or more targets 544. In this example, as the one or more targets move the positions of the one or more targets move (e.g., a first position 544A, a second position 544B, a third position 544C, etc.). In another example, one or more past positions of the sight may also be shown (e.g., a first sight position 548A, a second sight position 548B, a third sight position 548C, etc.). In another example, a virtual touch pad 552 may be utilized. In one example, a player via hand 520 may move from a first position 556 to a second position 556A and then to a third position 556B to control either the position (e.g., alignment) of the sights 548 and for firing the pistol. In one example, the firing is initiated by double tapping within virtual touch pad 552 and/or lifting one or more fingers.

Figure 5E:
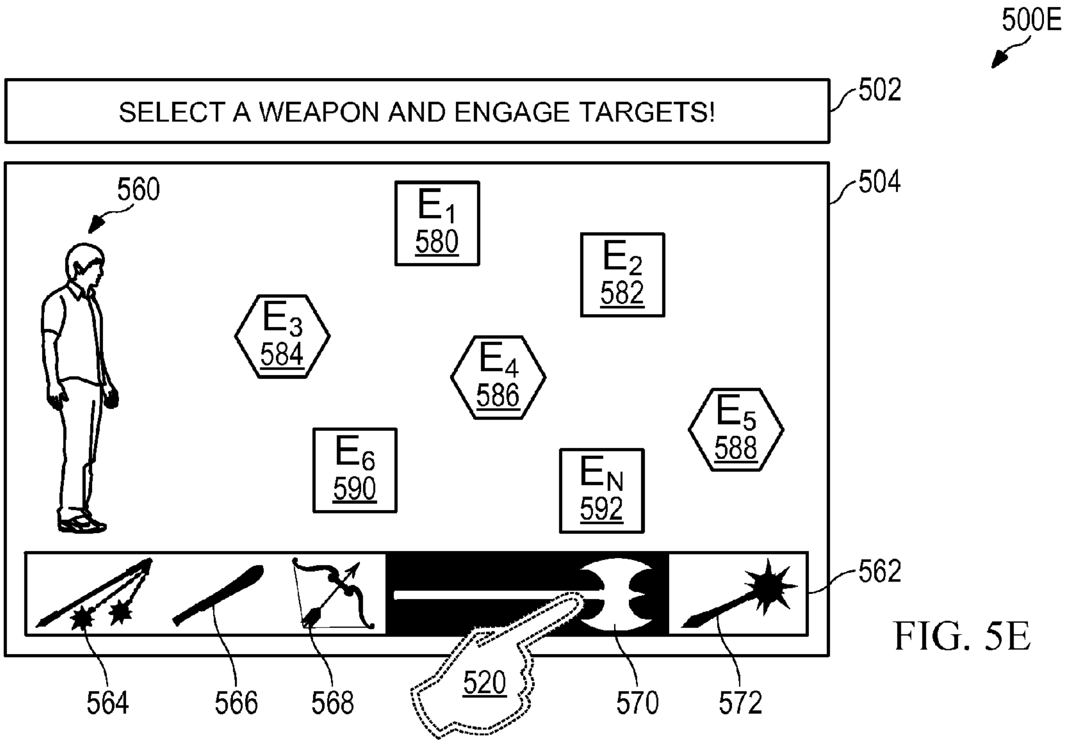
FIG. 5E is another illustration of skill-based tournament game play, according to one embodiment.

In FIG. 5E, another illustration of skill-based tournament game play 500E is shown, according to one embodiment. In this example, message area 502 may state "SELECT A WEAPON AND ENGAGE TARGETS!" In this example, a player icon 560 may utilize one or more weapons (e.g., a first weapon 564, a second weapon 566, a third weapon 568, a fourth weapon 570, a fifth weapon 572, an Nth weapon, etc.) versus one or more enemies (e.g., a first enemy 580, a second enemy 582, a third enemy 584, a fourth enemy 586, a fifth enemy 588, a sixth enemy 590, a seventh enemy 592, an Nth enemy, etc.). In one example, player icon 560 may select via hand 520 fourth weapon 570 (e.g., a long ax) to utilize against one or more enemies but at least third enemy 584. Depending on the characteristics of third enemy 584 and the characteristics of fourth weapon 570, the player may be successful or the player may fail. For example, the characteristics of fourth weapon (e.g., heavy, causes a lot of damage, but moves slowly) may be effective against a large slow moving enemy (e.g., dragon) but ineffective against a fast moving enemy (e.g., elf).

Figure 6:
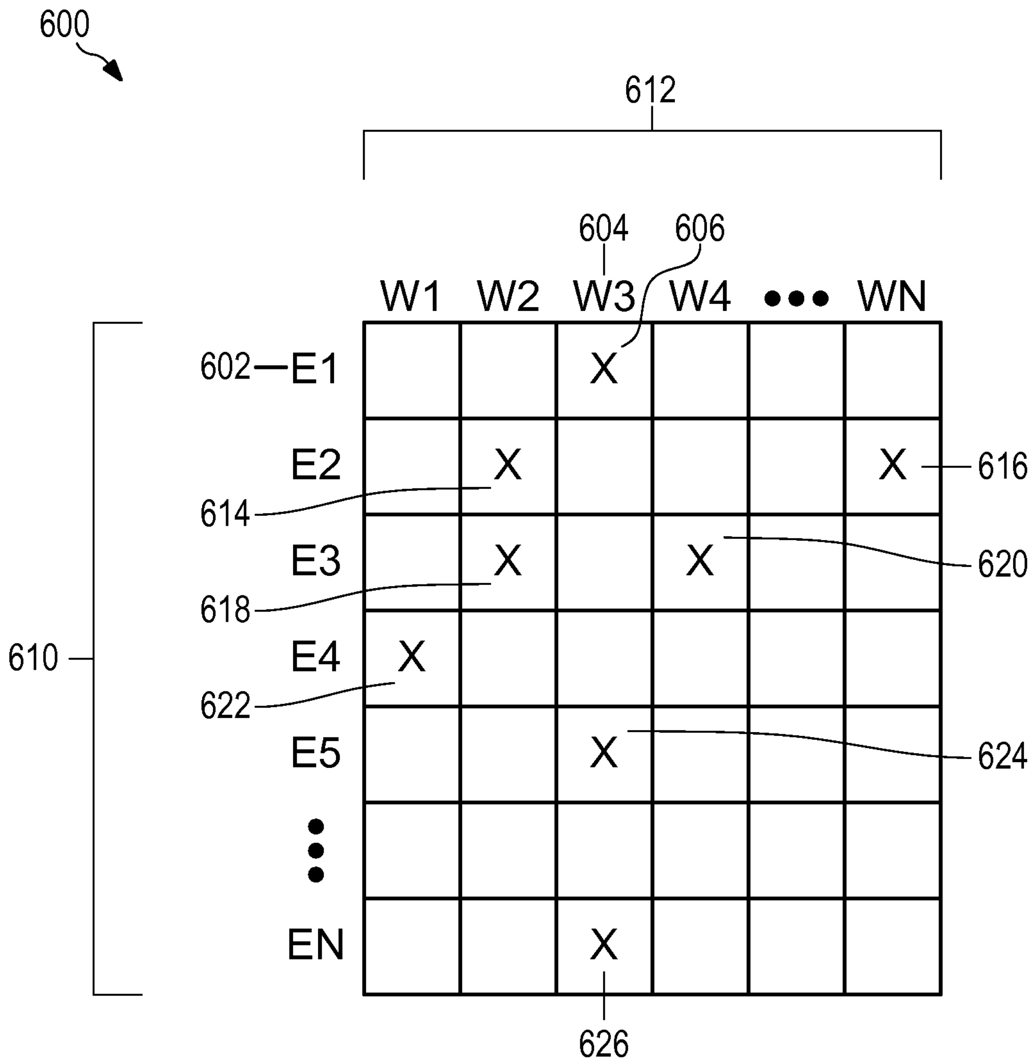
FIG. 6 is an illustration of skill-based tournament game play, according to one embodiment.

FIG. 6 is a weapon-enemy matrix 600, according to one embodiment. In this example, a strategic skill-based tournament game play may be utilized. In the examples that follow (see FIG. 6 to FIG. 11B), one or more players may have to select one or more weapons, ranges, locations, etc. to optimize an attack and/or defense against one or more enemies. In these examples, the strategic selection of weapons, ranges, locations, etc. will influence the outcome of the skill-based tournament game play.

In one example, weapon-enemy matrix 600 may include one or more enemy elements (e.g., E1, E2, E3, EN) on an enemy axis 610 (e.g., Y-Axis) and one or more weapon elements (e.g., W1, W2, W3, WN) on a weapon axis 612 (e.g., X-Axis).

In one example, a first enemy element 602 may be related via a first relation element 606 to a third weapon element 604. In this example, first relation element 606 may indicate that third weapon element 604 may eliminate/cancel/neutralize first enemy element 602.

In another example, a second enemy element may be related via a second relation element 614 to a second weapon element. In another example, the second enemy element may be related via a third relation element 616 to a $n^{th}$ weapon element. In this example, second relation element 614 may indicate that second weapon element may eliminate/cancel/neutralize second enemy element. Further, third relation element 616 may indicate that $N^{th}$ weapon element may eliminate/cancel/neutralize second enemy element.

In another example, a third enemy element may be related via a fourth relation element 618 to a second weapon element. In another example, the third enemy element may be related via a fifth relation element 620 to a fourth weapon element. In this example, fourth relation element 618 may indicate that second weapon element may eliminate/cancel/neutralize third enemy element. Further, fifth relation element 620 may indicate that the fourth weapon element may eliminate/cancel/neutralize third enemy element.

In another example, a fourth enemy element may be related via a sixth relation element 622 to a first weapon. In this example, sixth relation element 622 may indicate that first weapon may eliminate/cancel/neutralize fourth enemy element.

In another example, a fifth enemy element may be related via a seventh relation element 624 to third weapon 604. In this example, seventh relation element 624 may indicate that third weapon 604 may eliminate/cancel/neutralize fifth enemy element.

In another example, an $n^{th}$ enemy element may be related via an eighth relation element 626 to third weapon 604. In this example, eighth relation element 626 may indicate that third weapon 626 may eliminate/cancel/neutralize $n^{th}$ enemy element. Enemy element and weapon element may be any element.

In another example, one or more weapons may be required to eliminate/cancel/neutralize one or more enemy elements. For example, a combination of a first weapon and a fourth weapon may be required to eliminate a fourth enemy.

In one example, first weapon may weaken (e.g., slows the enemy down) the fourth enemy and fourth weapon may eliminate the weakened fourth enemy but may not eliminated a non-weakened fourth enemy.

Weapon-enemy matrix 600 may be any object-to-object matrix. For example, weapon-enemy matrix 600 may be people-animal matrix. In another example, weapon-enemy matrix 600 may be tool-machine matrix.

Figure 7:
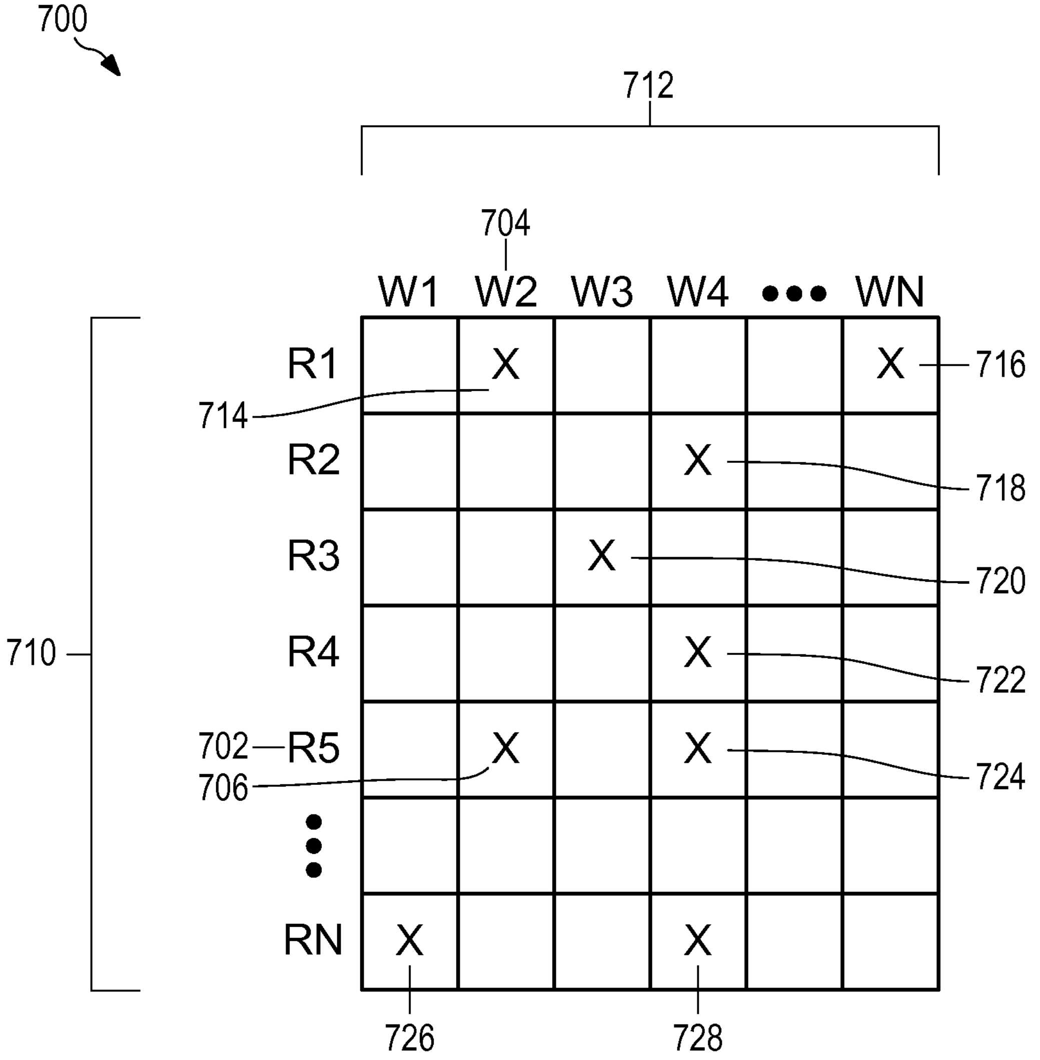
FIG. 7 is an illustration of skill-based tournament game play, according to one embodiment.

FIG. 7 is a weapon-range matrix 700, according to one embodiment. Weapon-range matrix 700 may include one or more range characteristics (e.g., R1, R2, R3, RN) on a range axis 710 (e.g., Y-Axis) and one or more weapon elements (e.g., W1, W2, W3, WN) on a weapon axis 712 (e.g., X-Axis).

In one example, a second weapon 704 may have one or more range characteristics. In this example, second weapon 704 may have a first range characteristic (e.g., noted by reference number 714) and/or a fifth range characteristic (e.g., noted by reference number 706). First range characteristic may indicate that any enemy, which may be eliminated by second weapon 704 would be eliminated when the enemy is within first range (e.g., a specific area 1). Fifth range characteristic may indicate that any enemy, which may be eliminated by second weapon 704 would be eliminated when the enemy is within fifth range (e.g., a specific area 2).

In one example, a first weapon may have one or more range characteristics. In this example, first weapon may only have an $N^{th}$ range characteristic (e.g., noted by reference number 726). $N^{th}$ range characteristic may indicate that any enemy, which may be eliminated by first weapon would be eliminated when the enemy is within the $n^{th}$ range (e.g., a specific area 3).

In one example, a third weapon may have one or more range characteristics. In this example, the third weapon may only have a third range characteristic (e.g., noted by reference number 720). Third range characteristic may indicate that any enemy, which may be eliminated by third weapon would be eliminated when the enemy is within the third range (e.g., a specific area 4).

In one example, fourth weapon may have one or more range characteristics. In this example, fourth weapon may have a second range characteristic (e.g., noted by reference number 718), a fourth range characteristic (e.g., noted by reference number 722), a fifth range characteristic (e.g., noted by reference number 724), and/or an $N^{th}$ range characteristic (e.g., noted by reference number 728). Second range characteristic may indicate that any enemy, which may be eliminated by the fourth weapon would be eliminated when the enemy is within the second range. Fourth range characteristic may indicate that any enemy, which may be eliminated by the fourth weapon would be eliminated when the enemy is within the fourth range. Fifth range characteristic may indicate that any enemy, which may be eliminated by the fourth weapon would be eliminated when the enemy is within fifth range. $N^{th}$ range characteristic may indicate that any enemy, which may be eliminated by fourth weapon would be eliminated when the enemy is within the $n^{th}$ range.

In one example, an $n^{th}$ weapon may have one or more range characteristics. In this example, the $N^{th}$ weapon may only have a first range characteristic (e.g., noted by reference number 716). First range characteristic may indicate that any enemy, which may be eliminated by the $n^{th}$ weapon would be eliminated when the enemy is within the first range.

Weapon-range matrix 700 may be any object-to-object characteristic matrix. For example, weapon-range matrix 700 may be people-movement speed matrix. In another example, weapon-range matrix 700 may be automotive-handling matrix.

Figure 8A:
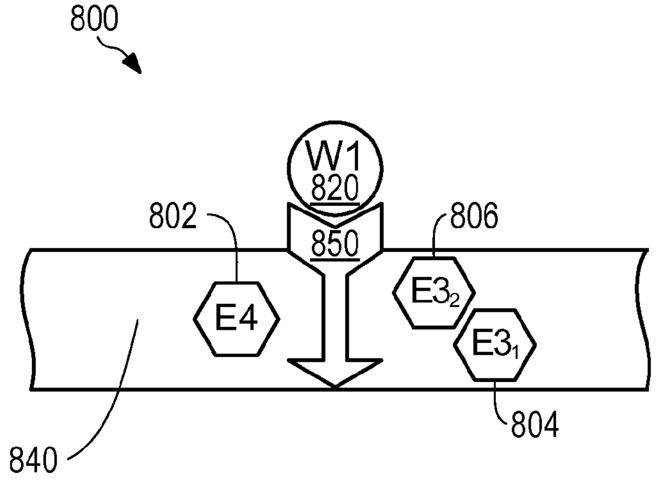
FIG. 8A is an illustration of skill-based tournament game play, according to one embodiment.

FIG. 8A is an illustration of a weapon-enemy interaction, according to one embodiment. A first image 800 may include game play path 840. On game play path 840, a first enemy 802 (e.g., a first object), first weapon 820, first firing range 850, a second enemy 804 (e.g., a second object), and a third enemy 806 (e.g., a third object) may be shown.

In this example, second enemy 804 and third enemy 806 have moved by first weapon 506 and through first firing range 850 without being stopped. In contrast, first enemy 802 has been stopped (e.g., eliminated) by first weapon 820 via first firing range 850.

Figure 8B:
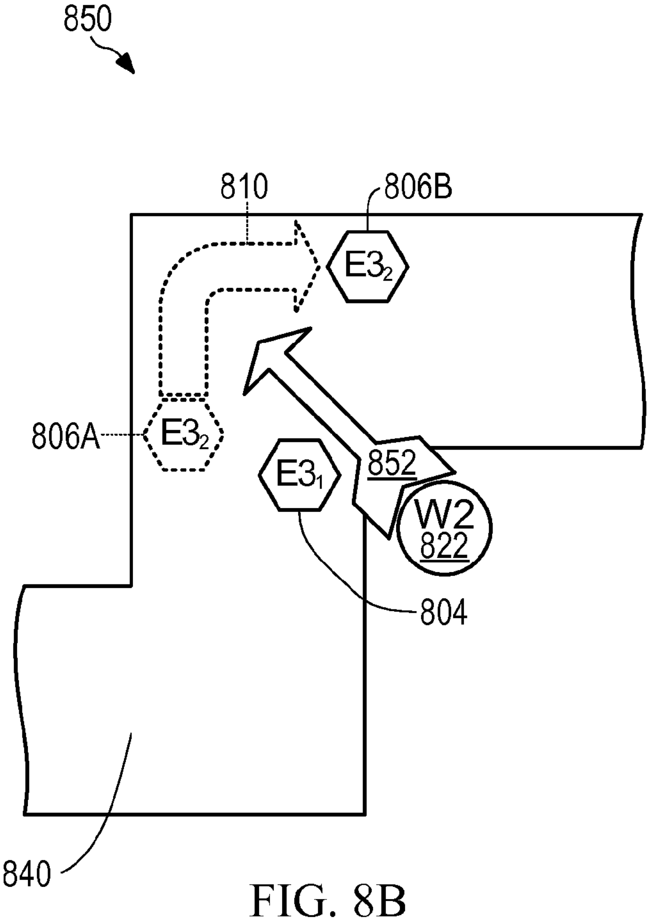
FIG. 8B is another illustration of skill-based tournament game play, according to one embodiment.

FIG. 8B is another illustration of a weapon-enemy interaction, according to one embodiment. A second image 850 may include game play path 840. On game play path 840, second enemy 804, second weapon 822, second firing range 852, and third enemy 806 may be shown.

In this example, second enemy 804 has been stopped (e.g., eliminated) by second weapon 504 via second firing range 852. Third enemy 806 has moved by second weapon 822 and through second firing range 852 without being stopped via a first path 810.

FIG. 9A is an illustration of a weapon-range interaction 900, according to one embodiment. Weapon-range interaction 900 may include fourth weapon 920, a first firing range 902, a second firing range 904, and a third firing range 906. The player may select one or more of these firing ranges. In one example, the player may select second firing range 904 (see FIG. 9B). The player may and/or may not be able to see the entire length of the range before their selection of a range. The player may be able to see the direction of the firing range but may not be able to see the range length. In another example, the player may select first firing range 902 (see FIG. 9C).

Figure 10A:
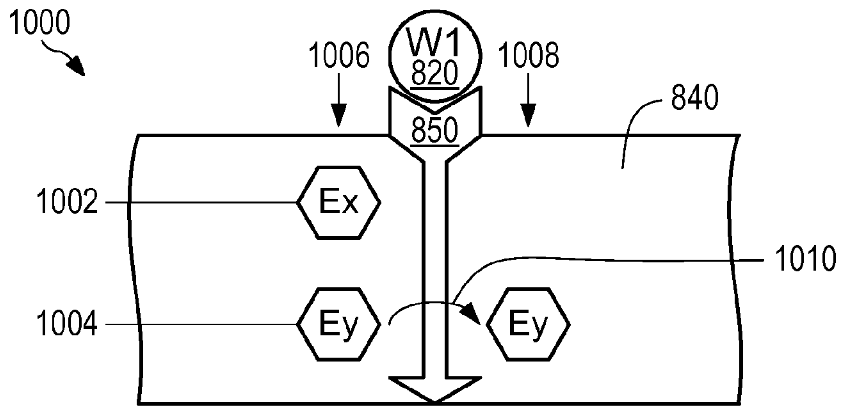
FIG. 10A is an illustration of skill-based tournament game play, according to one embodiment.

FIG. 10A is an illustration of weapon, range, and enemy interactions, according to one embodiment. A first image 1000 may include a first area 1006, a second area 1008, first weapon 820, first firing range 850, a first enemy 1002, and a second enemy 1004. In this example, first enemy 1002 may be stopped (e.g., eliminated) by first weapon 820 and/or first firing range 850 in first area 1006.

In another example, second enemy 1004 may bypass first firing range 850 by jumping over 1010 first firing range 850 into second area 1008. The ability to jump over a firing range may be based on a size of the object and/or any other object characteristic (e.g., swinging ability, strength, etc.). For example, a small object may not be able to jump over the firing range. Whereas, a larger object may be able to jump over the firing range (or a pit, a trap, etc.).

Figure 10B:
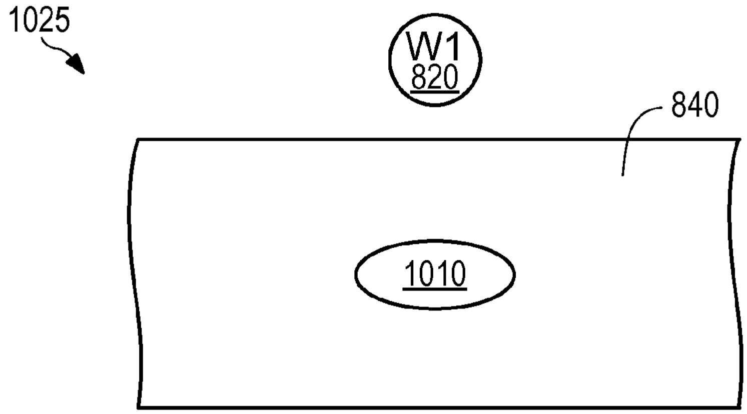
FIG. 10B is another illustration of skill-based tournament game play, according to one embodiment.

FIG. 10B is another illustration of weapon, range, and enemy interactions, according to one embodiment. A second image 1025 may include first weapon 820 with a shell firing range 1010. Shell firing range 1010 may be a firing range that is an island type firing area, which may eliminate one or more objects within the firing range.

Figure 10C:
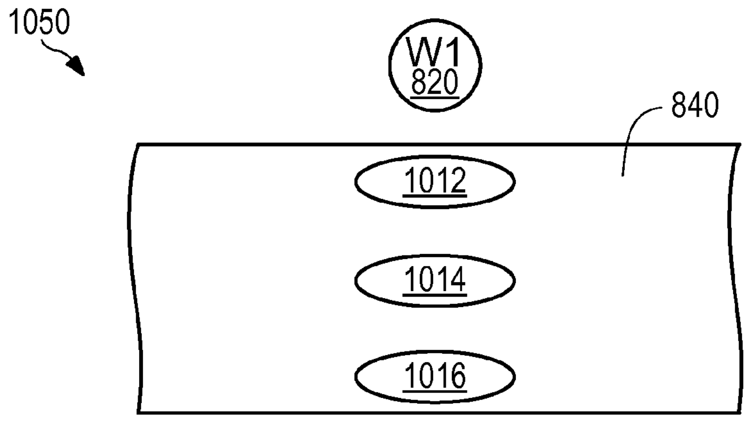
FIG. 10C is another illustration of skill-based tournament game play, according to one embodiment.

FIG. 10C is another illustration of weapon, range, and enemy interactions, according to one embodiment. A third image 1050 may include first weapon 820 with a first shell firing range 1012, a second shell firing range 1014, and a third shell firing range 1016.

Each item may relate to one or more presentation elements (e.g., visual elements and audio elements) and/or one or more multipliers (or other prize). For example, an item may include a red weapon, a six times multiplier, and/or a blue weapon. In one example, one or more weapons (e.g., objects) may include visual data (e.g., size, firing direction, firing pattern, etc.) and audio data (e.g., a weapon's sound, a target hit sound, etc.).

Each presentation may include numerous items (e.g., red weapon, blue weapon, green weapon, bonus multiplier, red pirate, green pirate, blue pirate, whammy pirate, starting pirate, ending pirate, save images, etc.). Each presentation may also include sound levels, various sound (e.g., gun fire, cannon fire, pirate sounds, ship noises, attacking sounds, injury sounds, people speaking, animal sounds, etc.). For example, a presentation may include red weapon, blue weapon, green weapon, bonus multiplier, red pirate, green pirate, blue pirate, whammy pirate, and ending pirate.

For example, a save image (e.g., fairy, angel, etc.) may provide help to one or more of the objects to increase game play payouts. In one example, a pirate may be close to ending game play and the angel may be displayed to eliminate this pirate. In another example, an object may be traveling along a path and get stuck in quick sand and a fairy may be displayed to help the object (e.g., a person) out of the quick sand. In another embodiment, a branch may fall to help the object out of the quick sand.

In one example, a first element may represent a medium sized red pirate moving from a first position in a first pattern. In another example, a second element may represent a large sized red pirate moving from a second position in a second pattern. In another example, a third element may represent a red supersized cross-bow aimed at a first position and having a first firing pattern. In another example, a fourth element may represent a blue small sized boat moving from a first position, in a first pattern, and able to pick up a small sized load.

In another example, a fifth element may be a brown haired medium sized person moving from a first position, at a first speed, and in a first pattern. In another example, a sixth element may be a blonde haired small sized person moving from a second position, at a second speed, and in a second pattern. In another example, a seventh element may be an animal (e.g., dog) moving from a third position, at a third speed, and in a third pattern. In should be noted that these individual elements may interact in the presentation.

In another example, an eighth element may be a blue pirate entering the presentation. In another example, a ninth element may be a red pirate entering the presentation. In another example, a tenth element may be a green pirate entering the presentation.

Figure 11A:
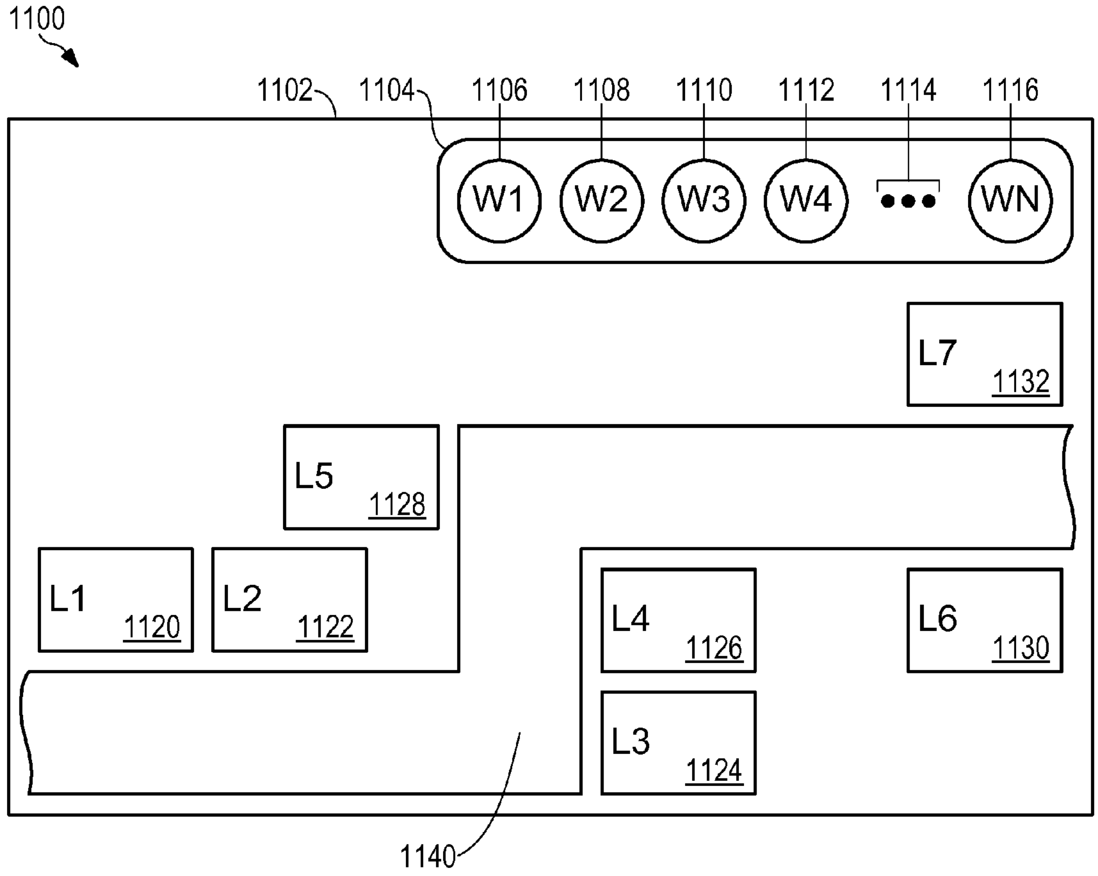
FIG. 11A is an illustration of skill-based tournament game play, according to one embodiment.

FIG. 11A is an illustration of a strategic skill-based tournament game play, according to one embodiment. FIG. 11A shows a screen image 1100 for electronic gaming device 100 on display 318. Screen image 1100 may include a display area 1102, an object selection area 1104, a first location 1120, a second location 1122, a third location 1124, a fourth location 1126, a fifth location 1128, a sixth location 1130, a seventh location 1132, and a game play path 1140. Object selection area 1104 may include a first object 1106, a second object 1108, a third object 1110, a fourth object 1112, and an $n^{th}$ object 1116. There may be up to an $n^{th}$ location.

Object selection area 1104 may be a selection area where a player may select one or more objects. These selected objects may be placed on and/or utilized in any area of display area 1102. The player may be able to drag the one or more objects and place them at various locations on display area 1102.

In one example, first object 1106 may be a first weapon, second object 1108 may be a second weapon, third object 1110 may be a third weapon, fourth object 1112 may be a fourth weapon, and $N^{th}$ object 1116 may be an $N^{th}$ weapon.

In one embodiment, a player, electronic gaming device 100, and/or electronic gaming system 200 may select one or more of first object 1106 (e.g., first weapon in this example), second object 1108 (e.g., second weapon in this example), third object 1110 (e.g., third weapon in this example), fourth object 1112 (e.g., fourth weapon in this example), and/or $N^{th}$ object 1116 (e.g., $N^{th}$ weapon in this example). Player, electronic gaming device 100, and/or electronic gaming system 200 may move first object 1106, second object 1108, third object 1110, fourth object 1112, and/or $N^{th}$ object 1116 from object selection area 1104 to one or more of first location 1120, second location 1122, third location 1124, fourth location 1126, fifth location 1128, sixth location 1130, and/or seventh location 1132.

Game play path 1140 may be where one or more game stopping elements appear (e.g., enemies), which may be eliminated by one or more of first object 1106, second object 1108, third object 1110, fourth object 1112, and/or $N^{th}$ object 1116.

It should be noted that the objects may be any item (e.g., a person, a weapon, a structure, an animal, a vehicle, a tool, an instrument, a natural feature (e.g., hill, mountain, lake, sea, etc.), a machine, and/or any other item).

For example, first object 1106 may be a first person, second object 1108 may be a second person, third object 1110 may be a third person, fourth object 1112 may be a fourth person, and $N^{th}$ object 1116 may be an $N^{th}$ person.

In another example, first object 1106 may be a first person, second object 1108 may be a first weapon, third object 1110 may be a second person, fourth object 1112 may be a first animal, and $N^{th}$ object 1116 may be an $N^{th}$ person.

Game data area (not shown) may include additional data relating to the games. For example, a game menu, a bet amount, a winning total, a credit total, a betting increment (e.g., $0.01 per credit), an input button (e.g., select, play, deal, draw, etc.), and/or any other gaming data may be shown.

Game menu button may include data relating to the game. For example, the payout structures, payout odds, the amount won over a predetermined number of game plays, the amount won over a specific time frame, and/or any other game play data may be accessed via game menu button. Game menu button may be utilized to change the game from a first game (e.g., slot machine theme 1) to a second game (e.g., slot machine theme 2, poker, blackjack, roulette, baccarat, craps, etc.). Game menu button may be utilized to change any other game structure (e.g., credit amounts). For example, the credit amount may be increased/decreased between $0.01 to $1.00 and/or any other values.

A bet reducer button (e.g., a downward arrow) may decrease the amount of credits wagered on game play. A bet amount image (e.g., 250) may show the amount of credits wagered on game play. A bet increaser button (e.g., an upward arrow) may increase the amount of credits wagered on game play. A credit amount image (e.g., 207,085) may show the amount of credits available to the player for game play. A win amount area (e.g., 1,000) may show the payout amount of the last event. A credit value image (e.g., $0.01) may show the value of a single credit. A play button may start the next game. A message area may display any message to the player. For example, the message may state "You Won 1,000 Credits. Congratulations!!!!!".

Figure 11B:
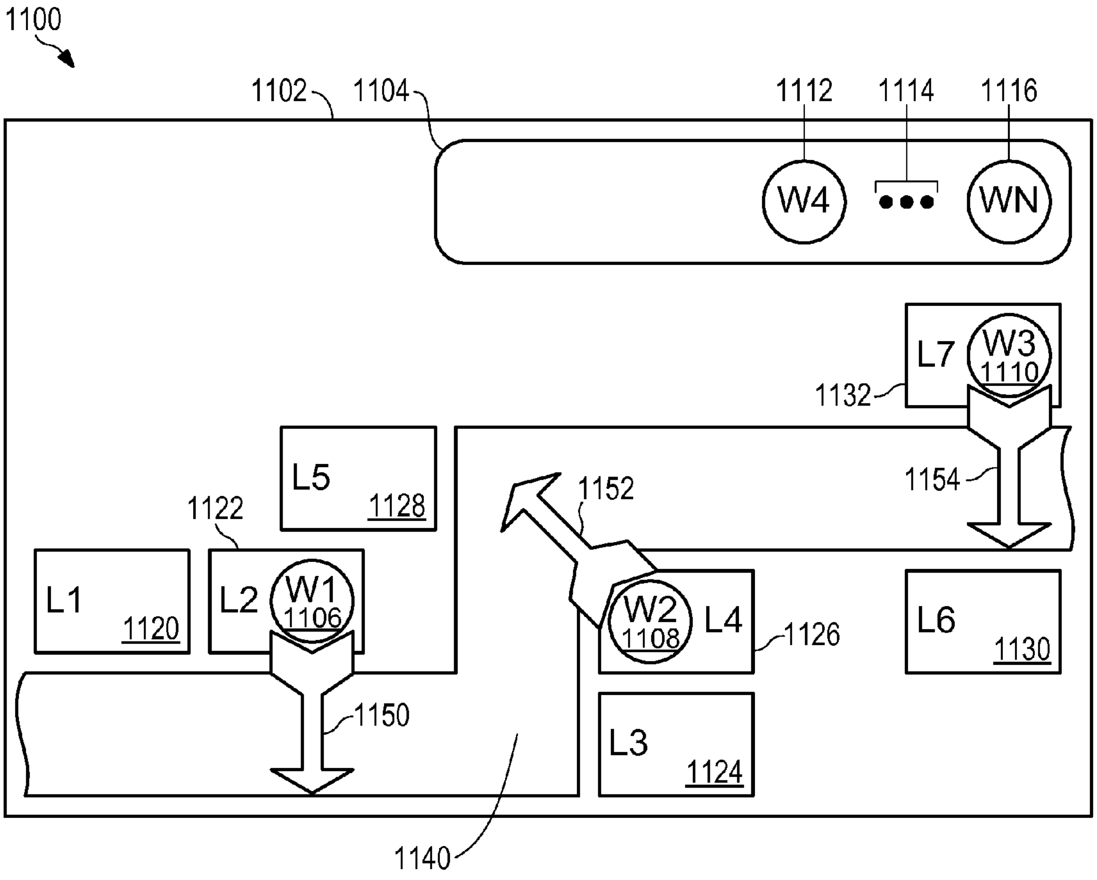
FIG. 11B is another illustration of skill-based tournament game play, according to one embodiment.

FIG. 11B is another illustration of a strategic skill-based tournament game play, according to one embodiment. In this example, first object 1106 (e.g., a cross-bow, a canon, a gun, a rocket launcher, etc.) may be positioned in second location 1122 with a first firing range 1150. First firing range 1150 may have a range which covers the entire vertical path (e.g., 90 degrees) of game play path 1140. In this example, second object 1108 (e.g., a tank, an airplane, a trap, etc.) may be positioned in fourth location 1126 with a second firing range 1152. Second firing range 1152 may have a range which covers a portion (but not all) of game play path 1140. In this example, third object 1110 (e.g., a boat, a soldier, etc.) may be positioned in seventh location 1132 with a third firing range 1154. Third firing range 1154 may have a range which covers the entire vertical path (e.g., 90 degrees of game play path 1140).

In one example, the player may select three objects from the $n^{th}$ objects available for selection. Any number of characters, weapons, objects, and/or selections may be utilized.

In another example, a multi-level item selection option may be utilized. In one example, if the player selects an item which is a multi-level item, then the player may have the option to select one or more of multi-level selection option. In one example, if a player selects a bow, then there may be a multi-level selection option which may include various types of bows (e.g., long bow, cross bow, etc.) that may be selected by the player that have different characteristics.

In one example, the player may select three weapons (and/or any other number of weapons, objects, etc.) from the $n^{th}$ weapons available for selection. If the player makes weapons selection, which included second weapon (e.g., second object 1108), third weapon (e.g. third object 1110), and fourth weapon (e.g., fourth object 1112), then the award amount for this selection may have been 5,000 credits (e.g., 2,500+1,500+1,000=5,000). If the player makes a selection of first weapon (e.g., first object 1106), third weapon (e.g., third object 1110), and fourth weapon (e.g., fourth object 1112), then the award amount may have been 3,500 credits (e.g., 1,000+1,500+1,000=3,500).

In a multi-level selection option example, if the player makes weapons selection, which included second weapon (e.g., second object 1108), third weapon (e.g. third object 1110), and fourth weapon (e.g., fourth object 1112) where the fourth weapon was a multi-level selection option, then the player may have the option to select one or more of a first multi-level weapon selection option, a second multi-level weapon selection option, and/or a third multi-level weapon selection option. If the player selects third multi-level weapon selection option, then the award amount may increase to 6,000 credits (e.g., 2,500+1,500+2,000=6,000) as compared to the non-multi-level weapon selection option (e.g., 5,000). If the player selects second multi-level weapon selection option, then the award amount may increase to 7,000 credits (e.g., 2,500+1,500+3,000=7,000) as compared to the non-multi-level weapon selection option (e.g., 5,000). If the player selects first multi-level weapon selection option, then the award amount may decrease to 4,500 credits (e.g., 2,500+1,500+500=4,500) as compared to the non-multi-level weapon selection option (e.g., 5,000).

Any number of multi-level items may be utilized, along with any number of selections.

Figure 12A:
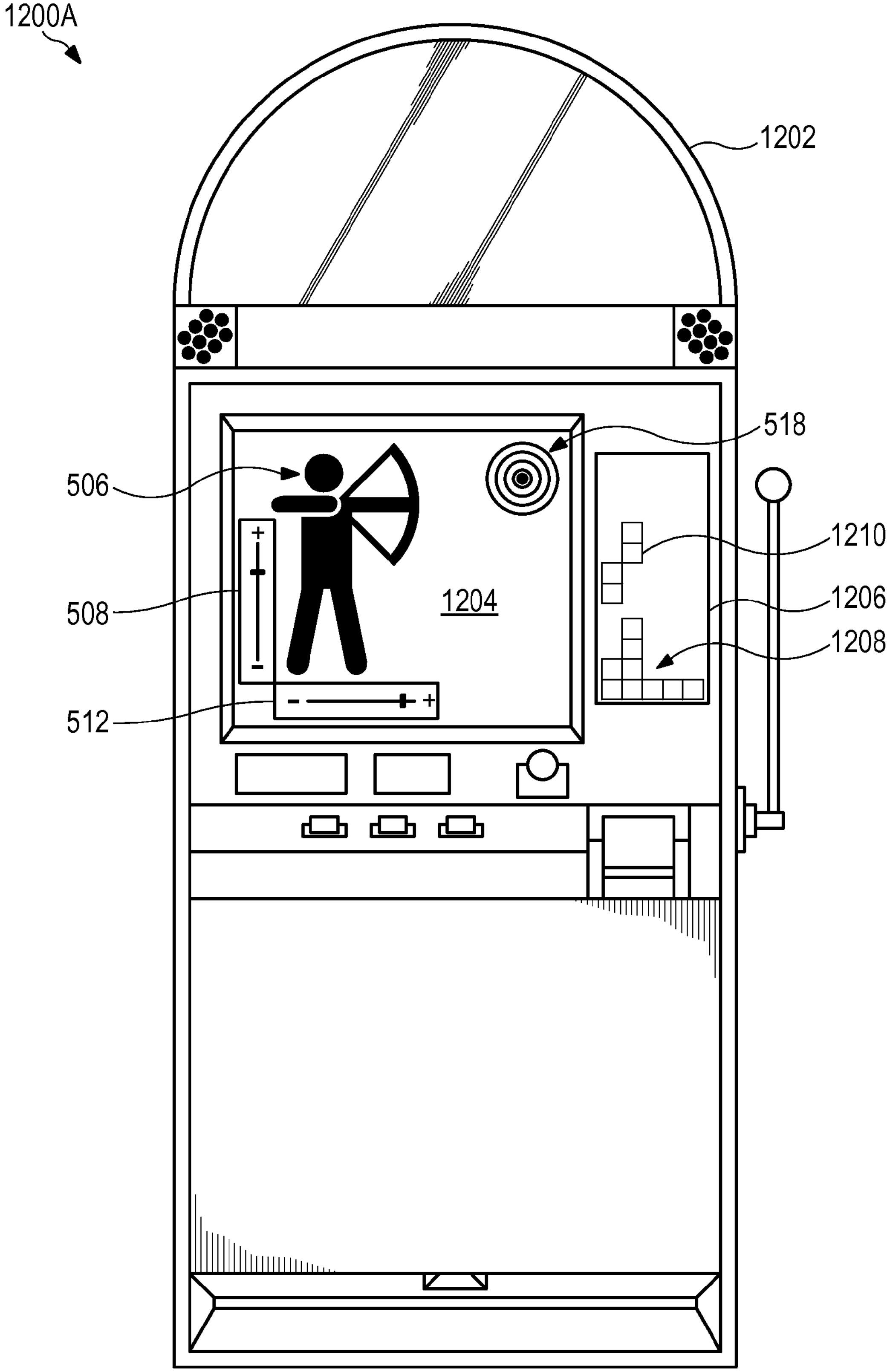
FIG. 12A is an illustration of skill-based tournament game play, according to one embodiment.
Figure 12B:
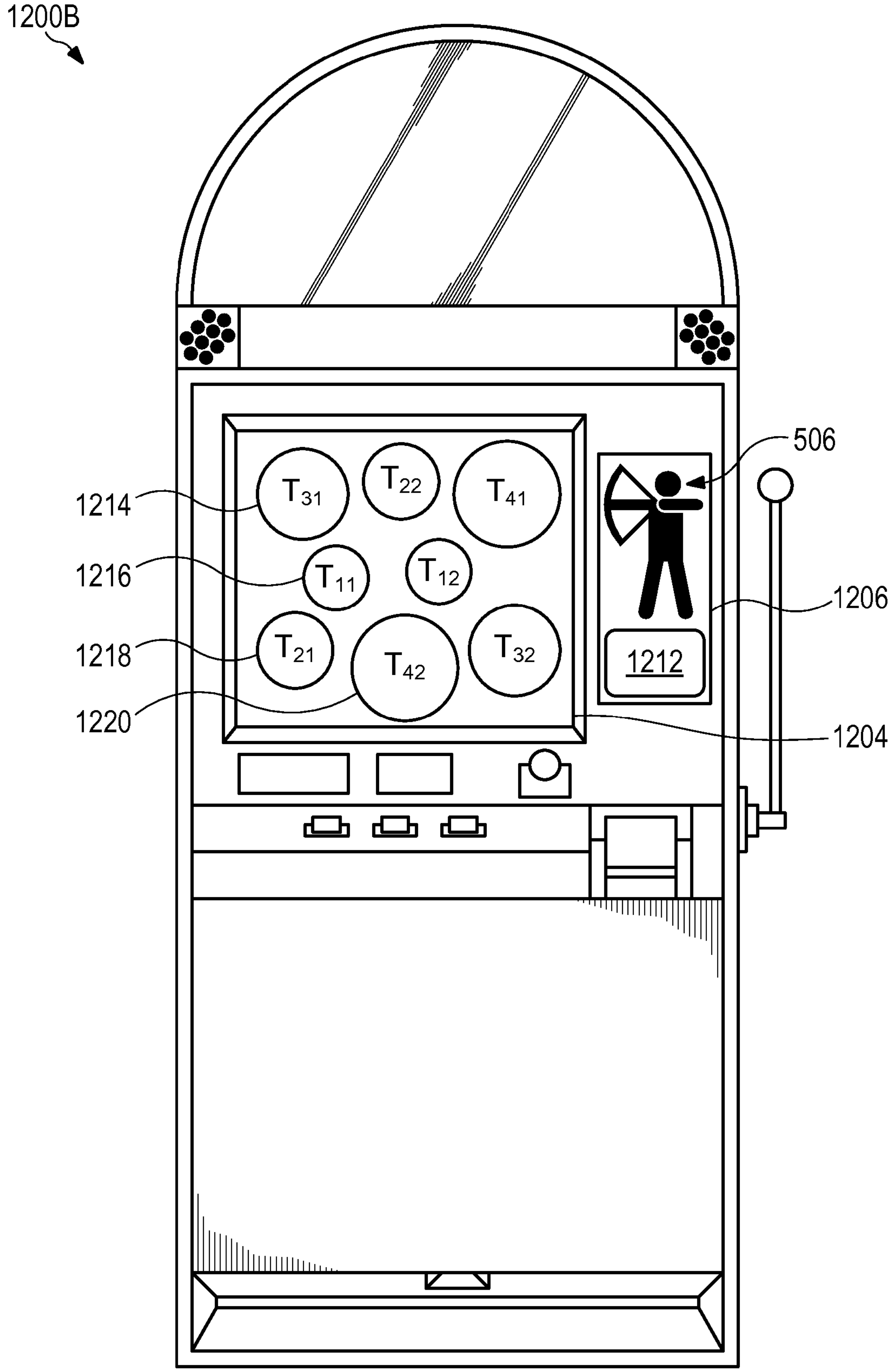
FIG. 12B is another illustration of skill-based tournament game play, according to one embodiment.

FIG. 12A shows an illustration of skill-based tournament game play, according to one embodiment. In this example, player icon 506, angle setting area 508, and power setting area 512 for a first skill-based game play are shown on a first display 1204. Further, a second skill-based game play is shown on a second display 1206. Second skill-based game has a first block piece 1210 which may interrelate with base blocks 1208. In another example, player icon 506 may aim at one or more targets. The one or more targets may be of different sizes (e.g., very small, small, medium, above average, big, very big, etc.) (see FIG. 12B). Based on the size and/or location a target may be more difficult to hit than another target. In other words, the size, location, movement pattern, speed of movement, and/or any other characteristic of the target may increase the difficultly of hitting the target which may increase the prize size for any particular target. In various examples, a first target 1214 may be of a medium size and in an above-average difficultly-to-hit position. Whereas, a second target 1216 may be a very small size in an average difficulty-to-hit position. In another example, a third target 1218 may have an average size and be in a high difficulty-to-hit position. Further, a fourth target 1220 may have a very big size and an easy-to-hit position. In another example, an easy-to-hit target (e.g., T41) may be very big and have an easy-to-hit location.

Figure 12C:
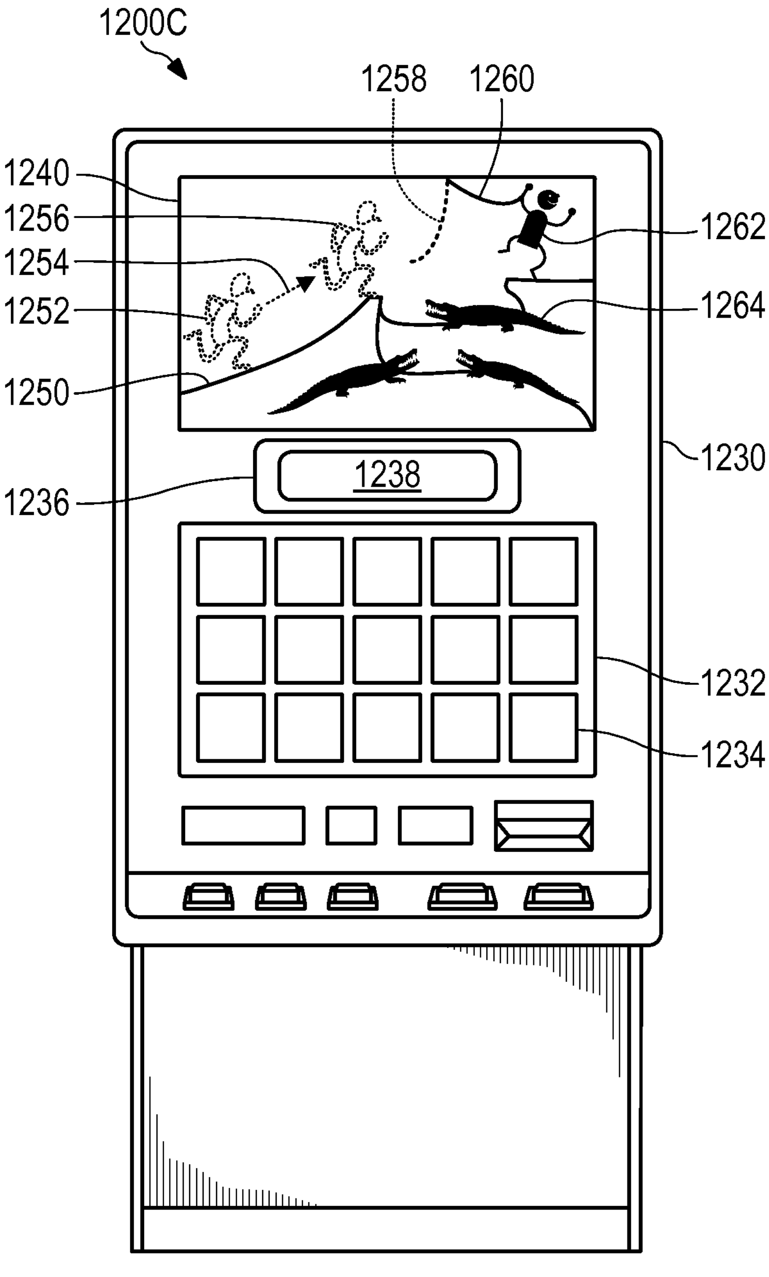
FIG. 12C is another illustration of skill-based tournament game play, according to one embodiment.

In another example seen in FIG. 12C, a skill-based jumping game 1200C is shown. In this example, a first terrain 1250 is shown with a first threat 1264. In this example, a player moves the player icon from a first position 1252 via a first path 1254 to a launch position 1256 to try to jump via a second path 1258 (e.g., on a rope) to a safe location 1262.

In another example, a virtual touch pad may be utilized to control the bow, the angle, the draw length, release functions, and/or any other functionality. Further, the angle may be controlled by an up/down movement and a release may be initiated by a double click (e.g., tap) within the present area. In another example, the virtual touch pad may control an icon's (e.g., Dirk, etc.) speed, jump-off point, aim, etc. Speed may be controlled by the velocity/acceleration of a left-to-right movement, and a jump-off point (and/or a grasping for the rope movement, etc.) may be initiated by a double tap motion.

Figure 13A:
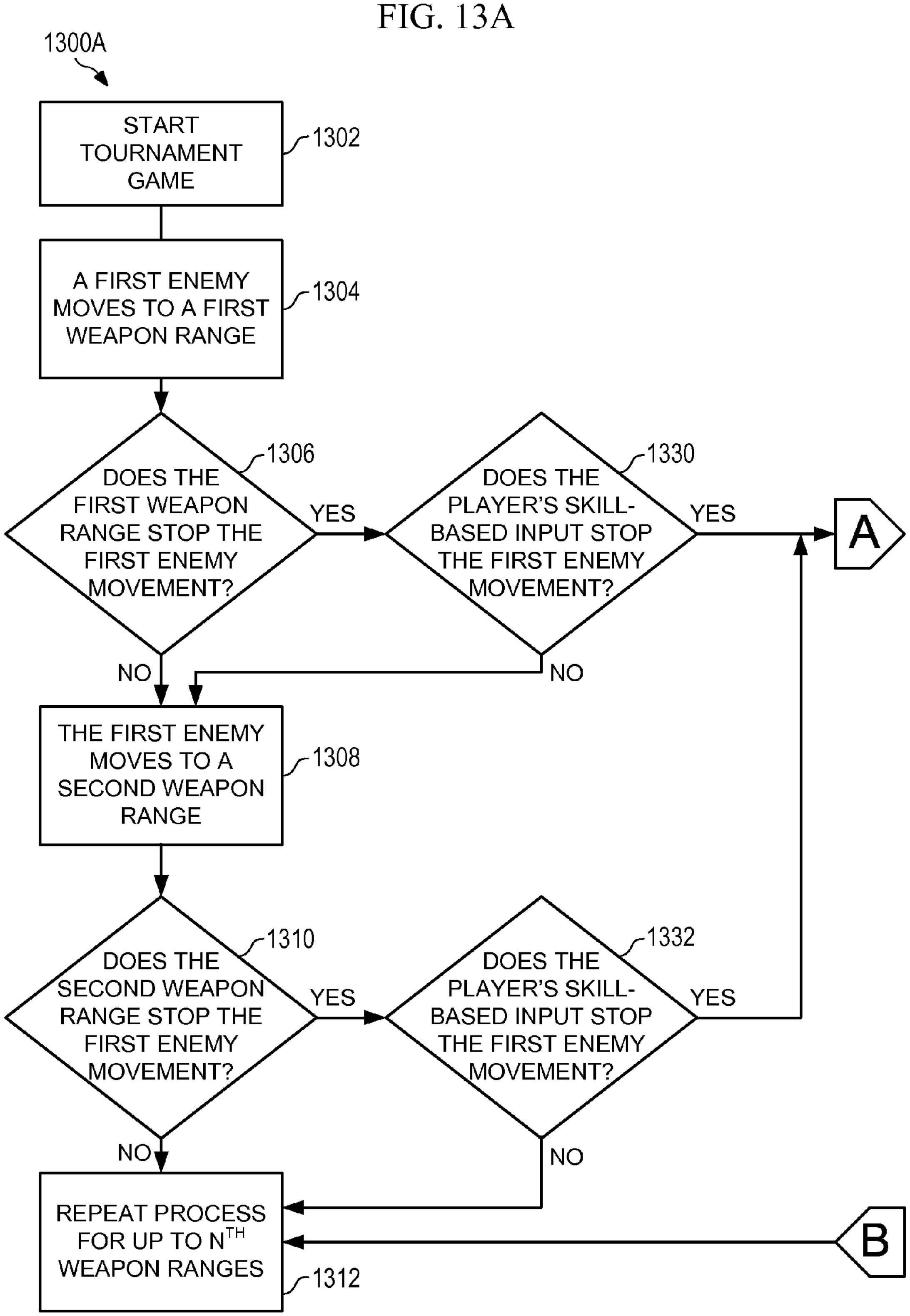
FIG. 13A is a flow diagram for skill-based tournament game play, according to one embodiment.
Figure 13B:
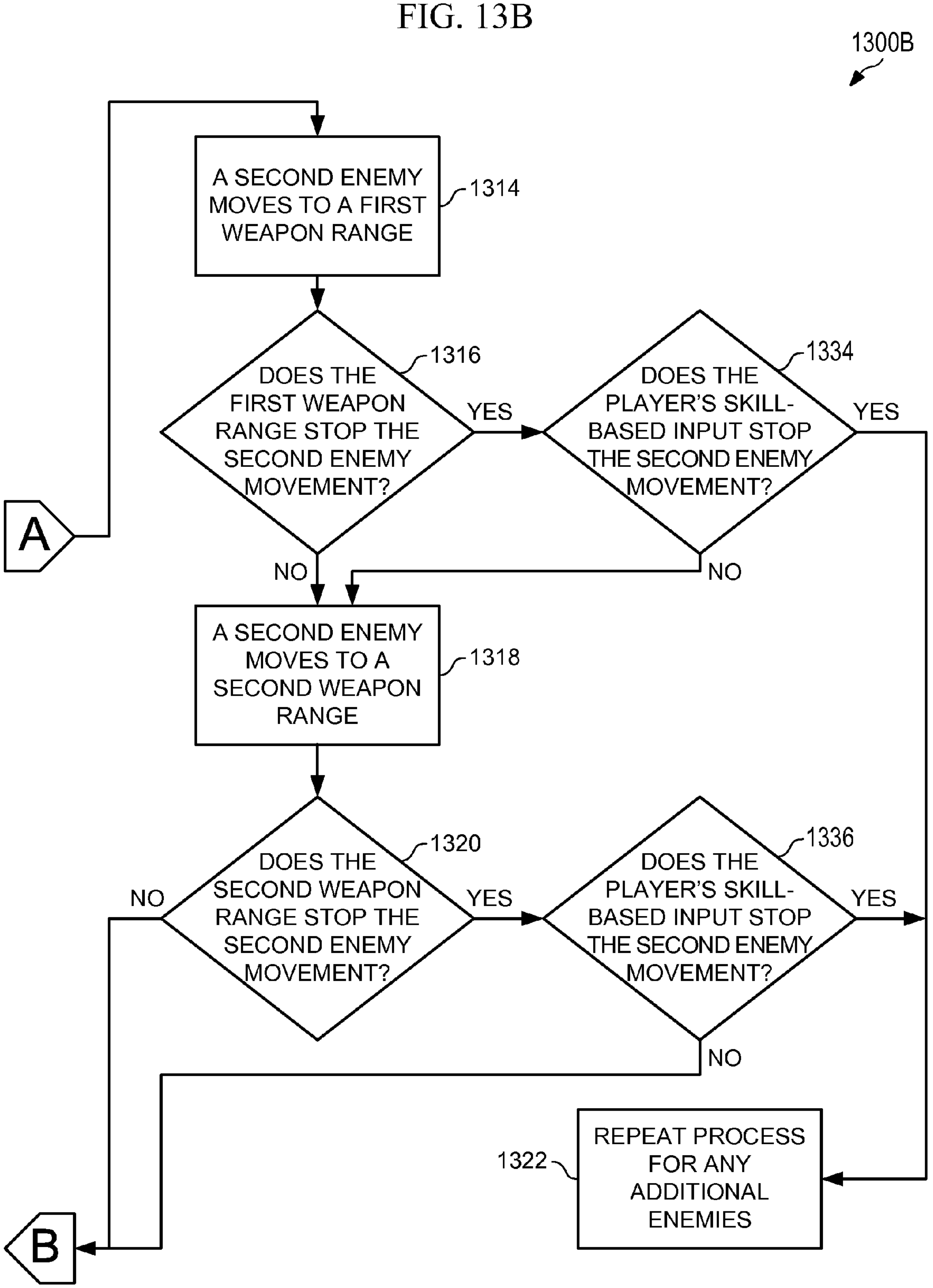
FIG. 13B is another flow diagram for skill-based tournament game play, according to one embodiment.

In FIG. 13A, a flow diagram for skill-based tournament game play 1300A is shown, according to one embodiment. The method may include starting one or more tournament game plays (step 1302). The method may include a first object (e.g., an enemy, a target, etc.) moving into a first item range (e.g., a first weapon range, etc.) (step 1304). The method may include electronic gaming device 100 and/or electronic gaming system 200 determining whether the first weapon range stops the first enemy movement (step 1306). If the first weapon range is capable of stopping the first enemy movement, then the method may include electronic gaming device 100 and/or electronic gaming system 200 determining whether the player's skill-based input stops the first enemy movement (step 1330). If the player's skill-based input does not stop the first enemy movement, then the method moves to step 1308. If the player's skill-based input does stop the first enemy movement, then the method moves to step 1314 (see FIG. 13B).

Referring back to FIG. 13A, the method may include the first enemy moving to a second weapon range (step 1308). The method may include electronic gaming device 100 and/or electronic gaming system 200 determining whether a second weapon range is capable of stopping the first enemy's movement (step 1310). If the second weapon range is not capable of stopping the first enemy's movement, then the method may include repeating the process for up to N weapon ranges (step 1312). If the second weapon range is capable of stopping the first enemy's movement, then the method may include electronic gaming device 100 and/or electronic gaming system 200 determining whether the player's skill-based input stopped the first enemy movement (step 1332). If the player's skill-based input does not stop the first enemy movement, then the method may move to step 1312. If the player's skill-based input does stop the first enemy movement, then the method may include a second enemy moving to a first weapon range (step 1314).

The method may include electronic gaming device 100 and/or electronic gaming system 200 determining whether the first weapon range stops the second enemy movement (step 1316). If the first weapon range is capable of stopping the second enemy movement, then the method may include electronic gaming device 100 and/or electronic gaming system 200 determining whether the player's skill-based input stops the second enemy movement (step 1334). If the player's skill-based input does not stop the second enemy movement, then the method moves to step 1318. If the player's skill-based input does stop the second enemy movement, then the method moves to step 1322, where the process is repeated for any number of additional enemies. The method may include a second enemy moving to a second weapon range (step 1318). The method may include electronic gaming device 100 and/or electronic gaming system 200 determining whether the second weapon range stops the second enemy movement (step 1320). If the second weapon range is capable of stopping the second enemy movement, then the method may include electronic gaming device 100 and/or electronic gaming system 200 determining whether the player's skill-based input stops the second enemy movement (step 1336). If the player's skill-based input does not stop the second enemy movement, then the method moves to step 1312. If the player's skill-based input does stop the second enemy movement, then the method moves to step 1322.

Figure 14:
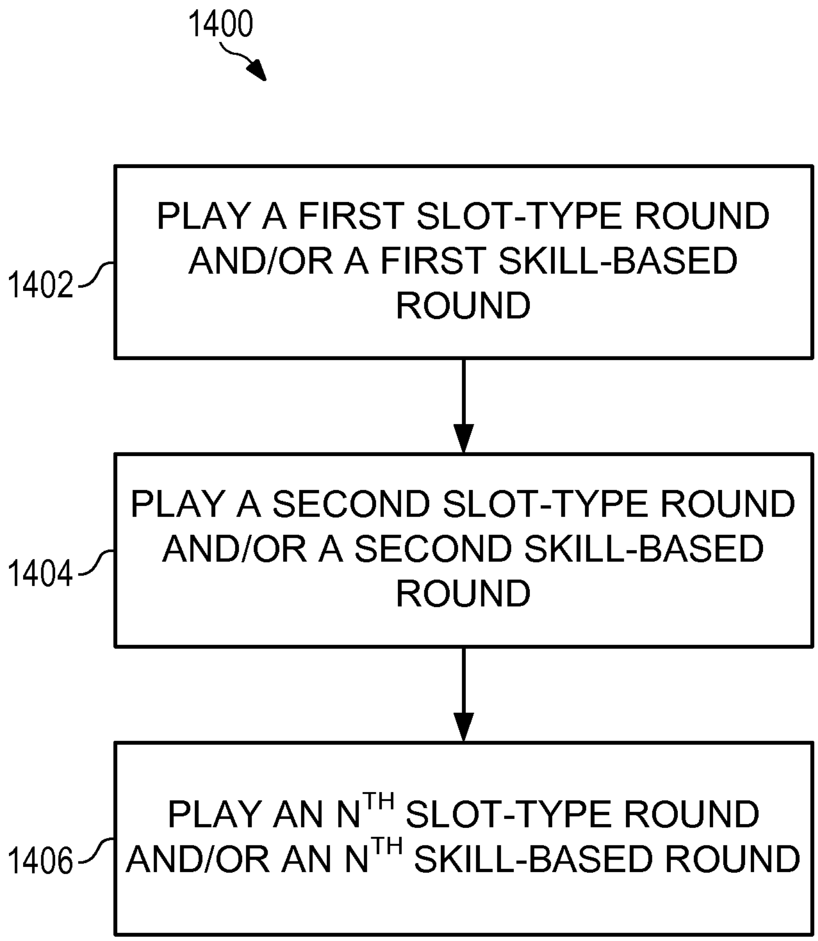
FIG. 14 is a flow diagram for skill-based tournament game play, according to one embodiment.

In FIG. 14, a flow diagram for skill-based tournament game play 1400 is shown, according to one embodiment. The method may include playing a first slot-type round and/or a first skill-based round (step 1402). The method may include playing a second slot-type round and/or a second skill-based round (step 1404). The method may include playing an Nth slot-type round and/or an Nth skill-based round (step 1406).

Figure 15:
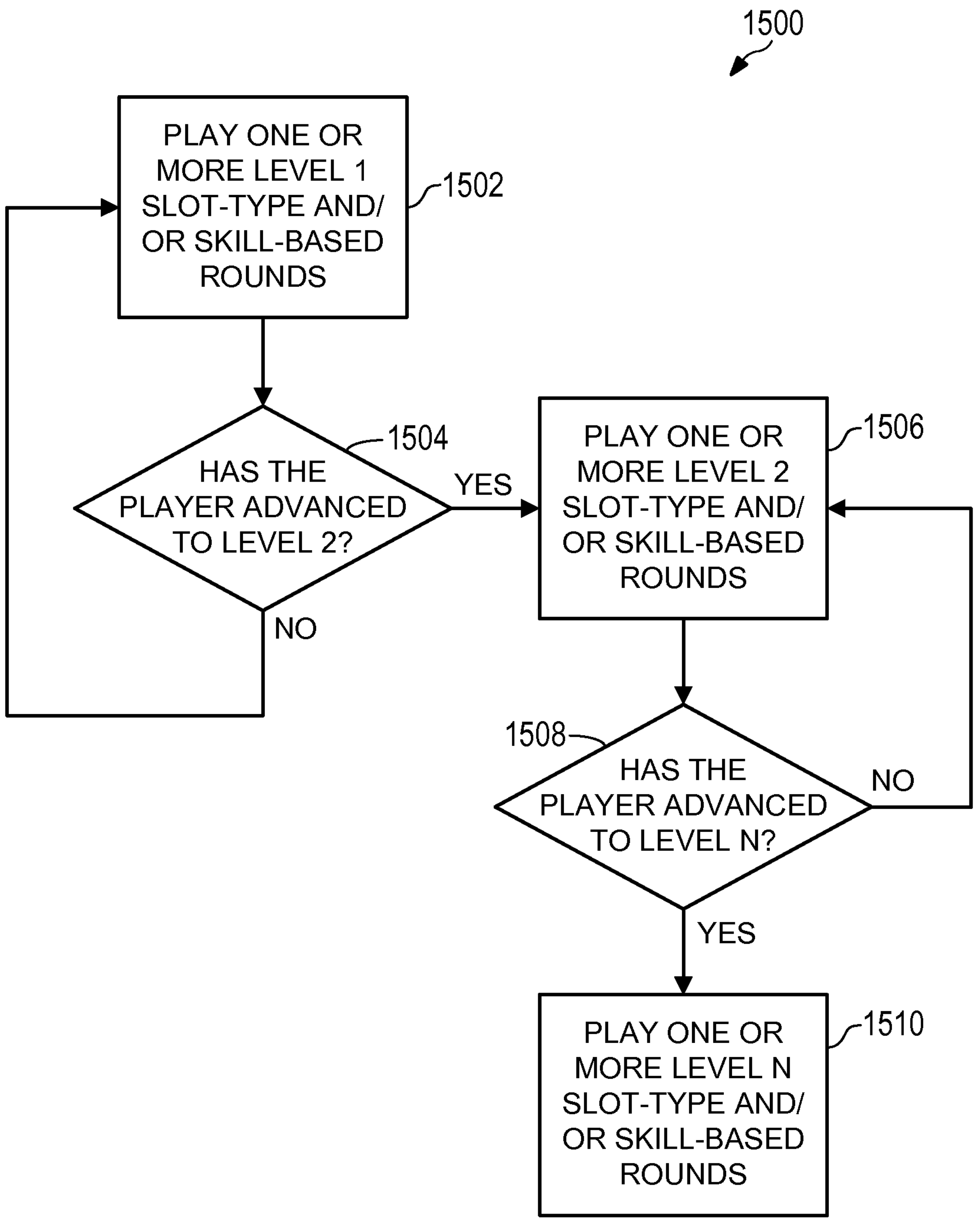
FIG. 15 is a flow diagram for skill-based tournament game play, according to one embodiment.

In FIG. 15, a flow diagram for skill-based tournament game play 1500 is shown, according to one embodiment. The method may include playing one or more level one slot-type and/or skill-based rounds (step 1502). The method may include electronic gaming device 100 and/or electronic gaming system 200 determining whether one or more players have advanced to level two game play (step 1504). If no players have advanced to level two game play, then the method moves back to step 1502. If one or more players have advanced to level two game play, then the method may include playing one or more level two slot-type and/or skill-based rounds (step 1506). The method may include electronic gaming device 100 and/or electronic gaming system 200 determining whether one or more players have advanced to level N game play (step 1508). If no players have advanced to level N game play, then the method may move back to step 1506. If one or more players have advanced to level N game play, then the method may include playing one or more level N slot-type and/or skill-based rounds (step 1510).

Figure 16:
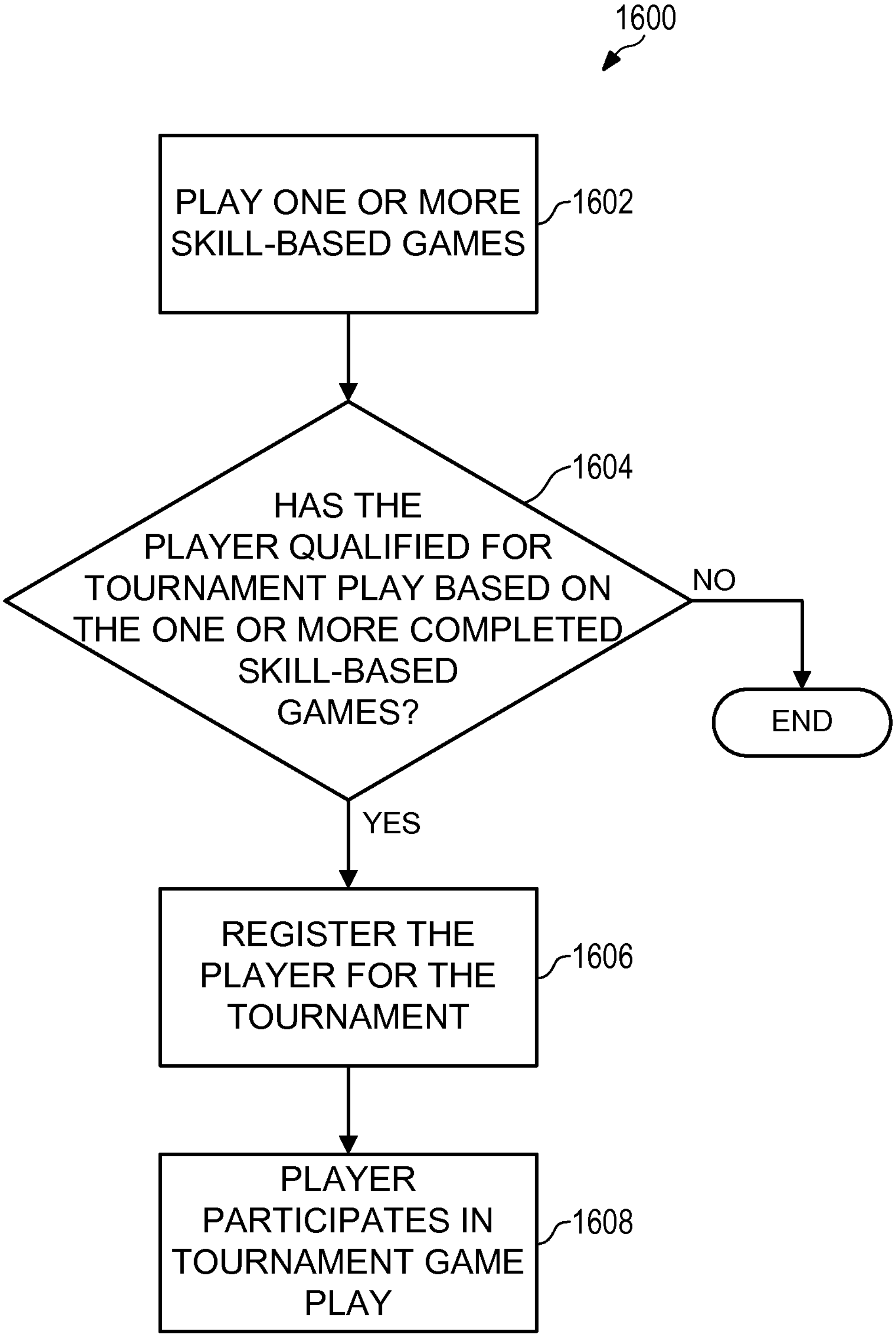
FIG. 16 is a flow diagram for skill-based tournament game play, according to one embodiment.

In FIG. 16, a flow diagram for skill-based tournament game play 1600 is shown, according to one embodiment. The method may include playing one or more skill-based games (step 1602). The method may include electronic gaming device 100 and/or electronic gaming system 200 determining whether one or more players have qualified for tournament play based on the one or more completed skill-based games (step 1604). If no players have qualified for tournament play, then the method may end. If one or more players have qualified for tournament play, then the method may register the one or more players for one or more tournaments (step 1606). The method may include one or more players participating in one or more tournaments (step 1608).

Figure 17A:
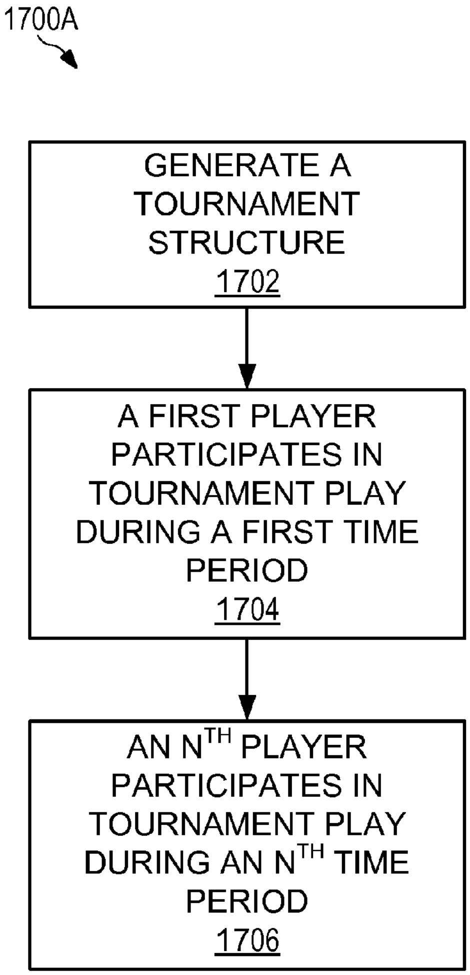
FIG. 17A is a flow diagram for skill-based tournament game play, according to one embodiment.

In FIG. 17A, a flow diagram for asynchronous tournament play 1700A is shown, according to one embodiment. The method may include generating one or more tournament structures (step 1702). The method may include a first player participating in the one or more tournaments during a first time period (step 1704). The method may include an Nth player participating in the one or more tournaments during an Nth time period (step 1706). For example, a first player may enter the tournament at 8 am on a Monday where the tournament structure is based on the best score (e.g., most credits) won in 2 hours. The tournament structure allows tournament game play for 3 days (e.g., Monday-Wednesday). The first player starts at 8 am on Monday and ends at 10 am on Monday with a score of 100,000 credits. In this example, a second player may enter the tournament at 11 am on Monday and ends at 1 pm on Monday with a score of 95,000 credits. Further, in this example, a third player may enter the tournament at Noon on Tuesday and ends at 2 pm on Tuesday with a score of 10,000 credits. In addition, a fourth player may enter the tournament at 9 am on Wednesday, stop tournament game play at 10 am to play in a poker game, resume tournament play at 2 pm, and end tournament play at 3 pm on Wednesday with a score of 200,000 credits.

Figure 17B:
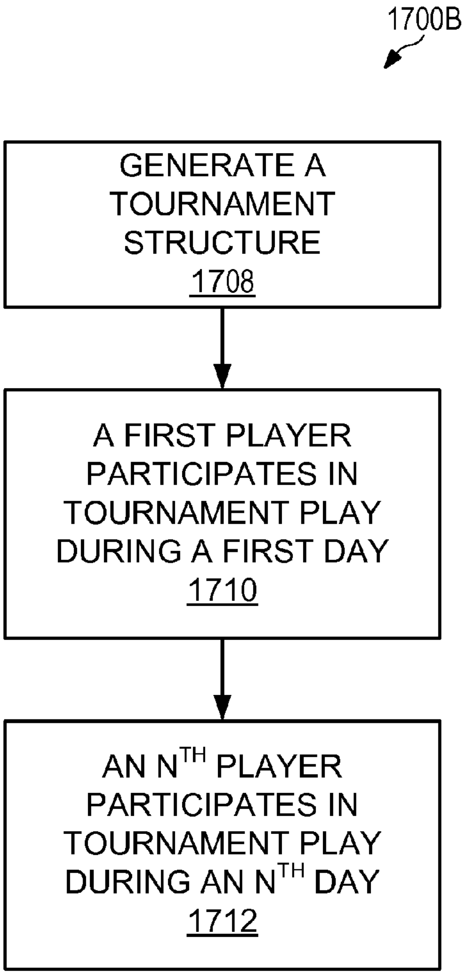
FIG. 17B is another flow diagram for skill-based tournament game play, according to one embodiment.

In FIG. 17B, another flow diagram for asynchronous tournament play 500B is shown, according to one embodiment. The method may include generating one or more tournament structures (step 1708). The method may include a first player participating in the one or more tournament structures during a first day (step 1710). The method may include an Nth player participating in the one or more tournament structures during an Nth day (step 1712). For example, a first player may enter a first tournament at 9 am, enter a second tournament at 9 am, and enter an Nth tournament at 10 am on the first tournament day for the first tournament, the second tournament day for the second tournament, and the last tournament day for the Nth tournament. In this example, the first player may suspend play in the first tournament right after entering the tournament, play in the second tournament from 9 am to 10 am, suspend play in the second tournament at 10 am, start playing in the Nth tournament at 10 am, finish the Nth tournament at 1 pm, resume tournament play in the second tournament at 1 pm, finish tournament play in the second tournament at 3 pm, resume tournament play in the first tournament at 8 am the next day, and/or finish tournament play in the first tournament at noon.

In one embodiment, all participants in a gaming tournament play structure do not need to participate simultaneously. By allowing the participants to play in the tournament over a time period window, the tournament becomes more exciting. In another example, a tournament might last a week and allow for thousands of participants whom play their scored game at any-time during that week. In various examples, this disclosure relates to system and/or method for a gaming tournament where participants play at their leisure during a much longer, i.e. multi-day, tournament period.

These methods may require a new architecture in the gaming tournament server. The features of the system may allow for participants to play their tournament game, at a slot on the casino floor, over the internet, on a mobile device, etc. The tournament management system may collect entries from players and publish leaderboard data to a variety of data consumers.

Figure 18:
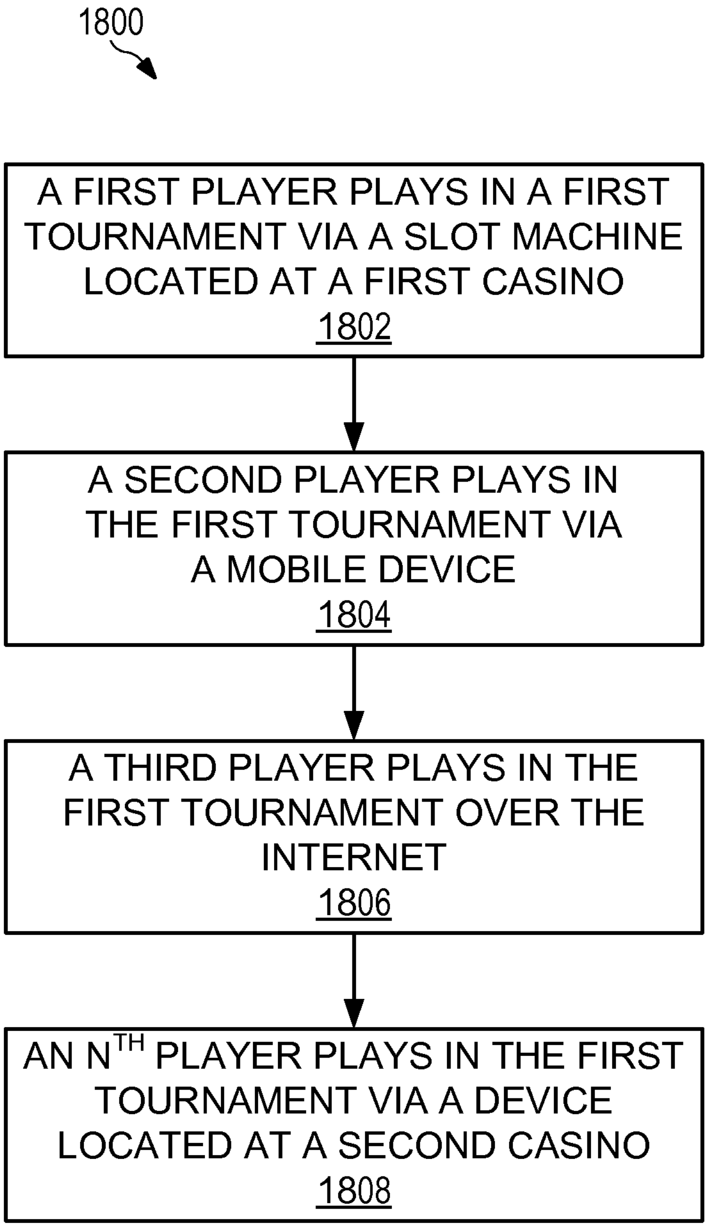
FIG. 18 is a flow diagram for skill-based tournament game play, according to one embodiment.

In FIG. 18, another flow diagram for asynchronous tournament play 1800 is shown, according to one embodiment. The method may include a first player playing in a first tournament via a slot machine located at a first casino (step 1802). The method may include a second player playing in the first tournament via a mobile device (step 1804). The method may include a third player playing in the first tournament over the internet (step 1806). The method may include an Nth player playing in the first tournament via a device located at a second casino (step 1808). For example, a first player may enter the first tournament at a first time (e.g., 9 am on Monday) by being physically present at the tournament host site. Further, the second player may enter the first tournament at a second time (e.g., 3 am on Tuesday) via a mobile device application. In addition, the third player may enter the first tournament at a third time (e.g., 8 am on Tuesday) via an internet connection to a server. In another example, a fourth player may enter the first tournament at a fourth time (e.g., 10 am on Friday) by being physically present at a non-host site (e.g., satellite site).

In another example, a first player may enter a first tournament at 9 am via a mobile device, enter a second tournament at 9 am in person at a host casino, and enter an Nth tournament at 10 am at a non-host site on the first tournament day for the first tournament, the second tournament day for the second tournament, and the last tournament day for the Nth tournament. In this example, the first player may suspend play in the first tournament right after entering the tournament via a pause button on the mobile device, play in the second tournament from 9 am to 10 am, suspend play in the second tournament at 10 am via a pause button on the gaming device, start playing in the Nth tournament at 10 am, finish the Nth tournament at 1 pm, resume tournament play in the second tournament at 1 pm via a resume button on the gaming device, finish tournament play in the second tournament at 3 pm, resume tournament play in the first tournament at 8 am the next day via a resume function on the mobile, and/or finish tournament play in the first tournament at noon.

Figure 19A:
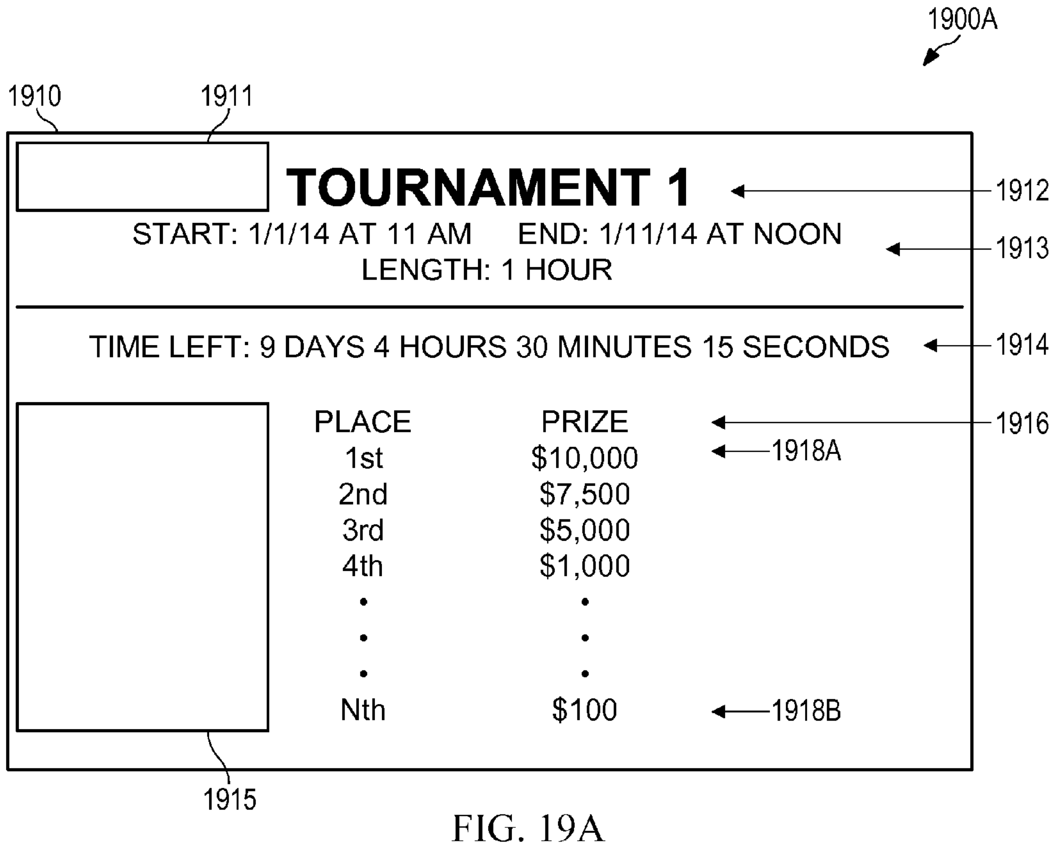
FIG. 19A is an illustration of displaying one or more skill-based game play data, according to one embodiment.

In FIG. 19A, an illustration of a display utilized in tournament play is shown, according to one embodiment. In one example, a first display image 1910 may include a tournament title area 1912, a tournament characteristics area 1913, a tournament status area 1914, a prize breakdown area 1916, a first prize area 1918A, an Nth prize area 1918B, a first advertisement area 1911, and a second advertisement area 1915. In one example, tournament title area 1912 may include the tournament name, one or more tournament locations, the number of tournament players, etc. In another example, tournament characteristic area 1913 may include the start time of the tournament, the end time of the tournament, the length of the tournament, one or more tournament windows, the last entry time, the cost of the tournament, etc. In another example, tournament status area 1914 may include the time left for the tournament, the time left to enter the tournament, the number of players registered for the tournament, the number of registered players that have completed the tournament, the number of registered players that still need to complete the tournament, the number of registered players that are currently participating in the tournament, etc. In another example, prize breakdown area 1916 may include one or more places (e.g., 1-N) and one or more prizes (e.g., first prize area 1918A to Nth prize area 1918B).

First advertisement area 1911 may include one or more advertisements and/or sponsor data. In one example, the one or more advertisements may offer a buy one get one free advertisement (e.g., shows, food, entertainment, lodging, etc.). In another example, the advertisement may be a free offer, a percentage off offer, and/or any other advertisement offering. In another example, the advertisements and/or sponsor data may be based on player preferences, player data, player demographics, and/or any other customizable data. In another example, the advertisements and/or sponsor data may be displayed at a first tournament time (e.g., beginning), at a second tournament time (e.g., a break period), at a third tournament time (e.g., 10 minutes into the tournament), at a fourth tournament time (e.g., at the end), and/or any other time period. Further, the advertisement and/or sponsor data may be related to any theme, promotion, a special event, and/or any other item.

Second advertisement area 1915 may include one or more advertisements and/or sponsor data. In one example, the one or more advertisements may offer a buy one get one free advertisement (e.g., shows, food, entertainment, lodging, etc.). In another example, the advertisement may be a free offer, a percentage off offer, and/or any other advertisement offering. In another example, the advertisements and/or sponsor data may be based on player preferences, player data, player demographics, and/or any other customizable data. In another example, the advertisements and/or sponsor data may be displayed at a first tournament time (e.g., beginning), at a second tournament time (e.g., a break period), at a third tournament time (e.g., 10 minutes into the tournament), at a fourth tournament time (e.g., at the end), and/or any other time period. Further, the advertisement and/or sponsor data may be related to any theme, promotion, a special event, and/or any other item.

Signage module may utilize data from any module, any other server (e.g., statistics server and/or signage server), and/or any other data source to generate images for display on: electronic gaming device 100; an internal display device within a gaming entity; an external display device outside of a gaming entity; one or more devices at one or more satellite locations; one or more mobile devices; one or more Internet sites; and/or any combination thereof.

In another example, a method may include obtaining data from one or more gaming devices and/or tournament servers. The method may also include generating historical data for the one or more gaming devices and/or tournament servers. The method may include generating a message for the one or more gaming devices, outside signage, inside displays, and/or any other device based on the historical data. The method may include displaying an image based on the message.

Figure 19B:
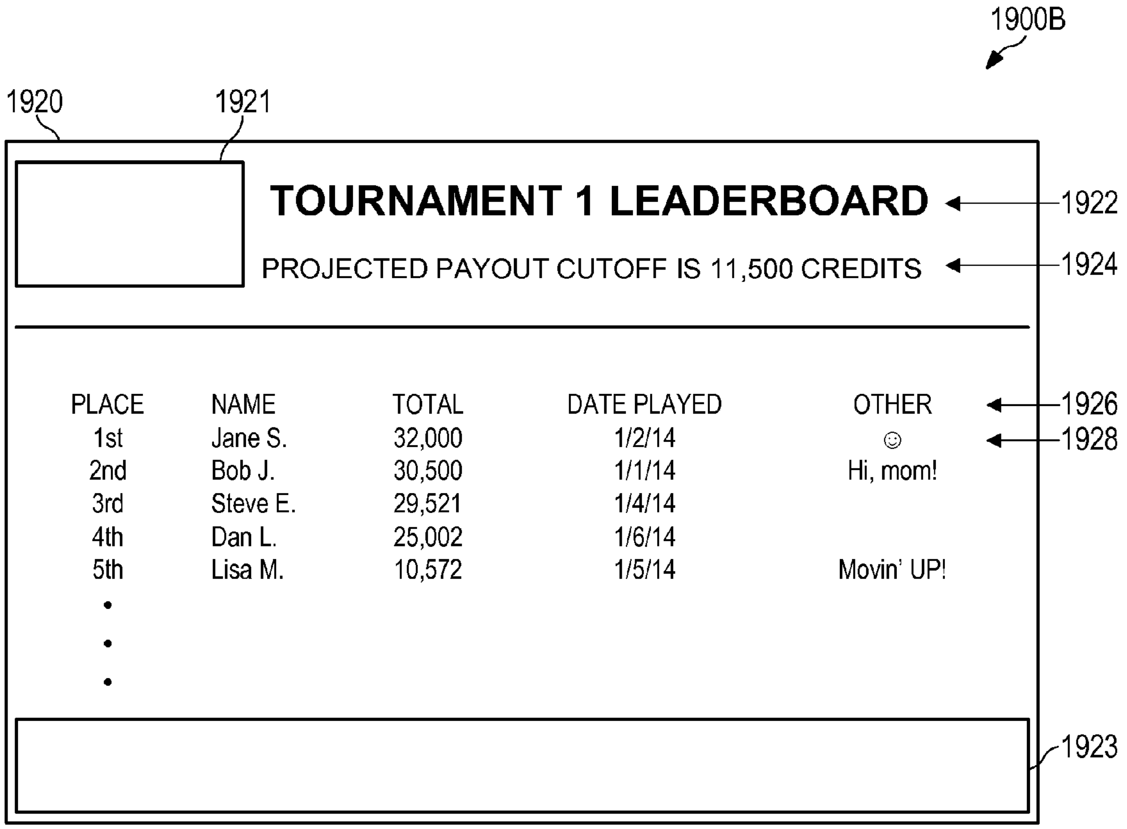
FIG. 19B is another illustration of displaying one or more skill-based game play data, according to one embodiment.

In FIG. 19B, another illustration of a display utilized in tournament play is shown, according to one embodiment. A second display 1920 may include a tournament leaderboard title area 1922, a player cutoff area 1924, a category area 1926, one or more data areas 1928, and a third advertisement area 1923. Tournament leaderboard title area 1922 may include the tournament's title, the current leader's name, the current leader's score, the payout for winning the tournament, the entry fee, the deadline for entering, one or more locations to play in the tournament, etc. Player cutoff area 1924 may include data relating to the estimated score needed to obtain one or more prizes. Category area 1926 may include player placement data (e.g., ranking from first to last), one or more players names relating to the one or more rankings, one or more total scores relating to the one or more players and/or rankings, one or more play dates relating to the one or more players and/or rankings, and/or a remarks area. One or more data areas 1928 may include the ranking numbers (e.g., $1^{st}$ to Nth), one or more player names, one or more scores, one or more dates played, and/or one or more other player comments (e.g., a smiley face, Hi Mom!, Moving Up!, Cannot Lose, etc.).

Third advertisement area 1923 may include one or more advertisements and/or sponsor data. In one example, the one or more advertisements may offer a buy one get one free advertisement (e.g., shows, food, entertainment, lodging, etc.). In another example, the advertisement may be a free offer, a percentage off offer, and/or any other advertisement offering. In another example, the advertisements and/or sponsor data may be based on player preferences, player data, player demographics, and/or any other customizable data. In another example, the advertisements and/or sponsor data may be displayed at a first tournament time (e.g., beginning), at a second tournament time (e.g., a break period), at a third tournament time (e.g., 10 minutes into the tournament), at a fourth tournament time (e.g., at the end), and/or any other time period. Further, the advertisement and/or sponsor data may be related to any theme, promotion, a special event, and/or any other item.

In one example, the leaderboard data may be utilized by casino signage showing tournament standings during the tournament period at the casino. In another example, the leadership data may be utilized by a webpage showing the same information. Further, a billboard external to the casino might advertise the leaderboard standings, have a tournament countdown, entry information, etc. In another example, social media websites may utilize this data (see FIG. 19D).

Figure 19C:
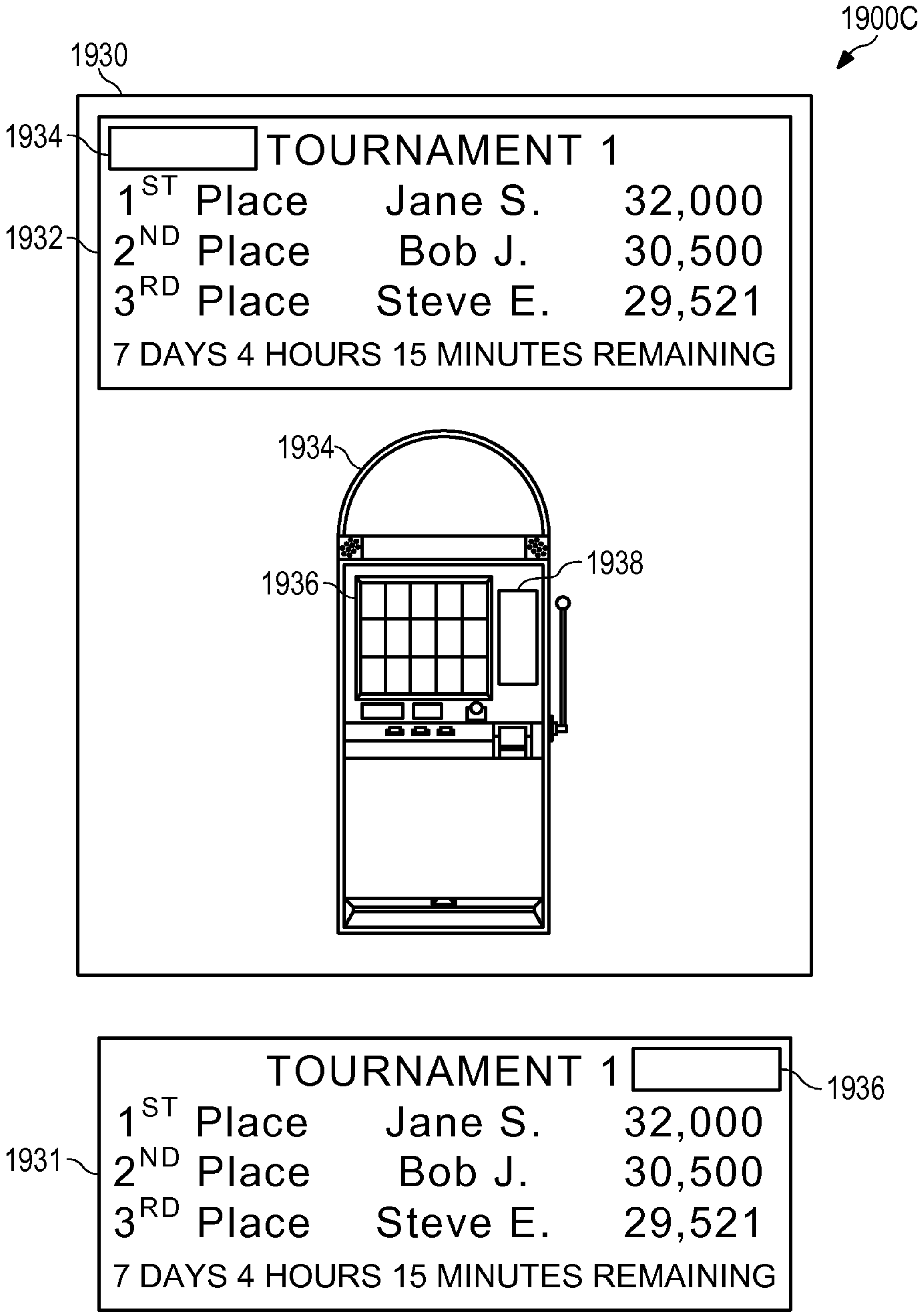
FIG. 19C is another illustration of displaying one or more skill-based game play data, according to one embodiment.

In FIG. 19C, another illustration of a display utilized in tournament play is shown, according to one embodiment. A third image 1930 may include a gaming device tournament display area 1932, a gaming device 1934, gaming slot area 1936, a gaming message area 1938, a fourth advertisement area 1934, and a fifth advertisement area 1936. Gaming device tournament display area 1932 may be located anywhere on gaming device (e.g., one or more displays, gaming message area 1938, etc.). Gaming device tournament display area 1932 may include data relating to the tournaments name, the current leaderboard, the ending time of the tournament, the number of players left, the amount of time left in the tournament, one or more prizes, the names and scores of one or more leaders, etc. In another example, a tournament display screen 1931 may be located in one or more locations within the casino. Tournament display screen 1931 may include data relating to the tournaments name, one or more locations to sign up for the tournament, the current leaderboard, the ending time of the tournament, the number of players left, the amount of time left in the tournament, one or more prizes, the names and scores of one or more leaders, etc.

Fourth advertisement area 1934 may include one or more advertisements and/or sponsor data. In one example, the one or more advertisements may offer a buy one get one free advertisement (e.g., shows, food, entertainment, lodging, etc.). In another example, the advertisement may be a free offer, a percentage off offer, and/or any other advertisement offering. In another example, the advertisements and/or sponsor data may be based on player preferences, player data, player demographics, and/or any other customizable data. In another example, the advertisements and/or sponsor data may be displayed at a first tournament time (e.g., beginning), at a second tournament time (e.g., a break period), at a third tournament time (e.g., 10 minutes into the tournament), at a fourth tournament time (e.g., at the end), and/or any other time period. Further, the advertisement and/or sponsor data may be related to any theme, promotion, a special event, and/or any other item.

Fifth advertisement area 1936 may include one or more advertisements and/or sponsor data. In one example, the one or more advertisements may offer a buy one get one free advertisement (e.g., shows, food, entertainment, lodging, etc.). In another example, the advertisement may be a free offer, a percentage off offer, and/or any other advertisement offering. In another example, the advertisements and/or sponsor data may be based on player preferences, player data, player demographics, and/or any other customizable data. In another example, the advertisements and/or sponsor data may be displayed at a first tournament time (e.g., beginning), at a second tournament time (e.g., a break period), at a third tournament time (e.g., 10 minutes into the tournament), at a fourth tournament time (e.g., at the end), and/or any other time period. Further, the advertisement and/or sponsor data may be related to any theme, promotion, a special event, and/or any other item.

Figure 19D:
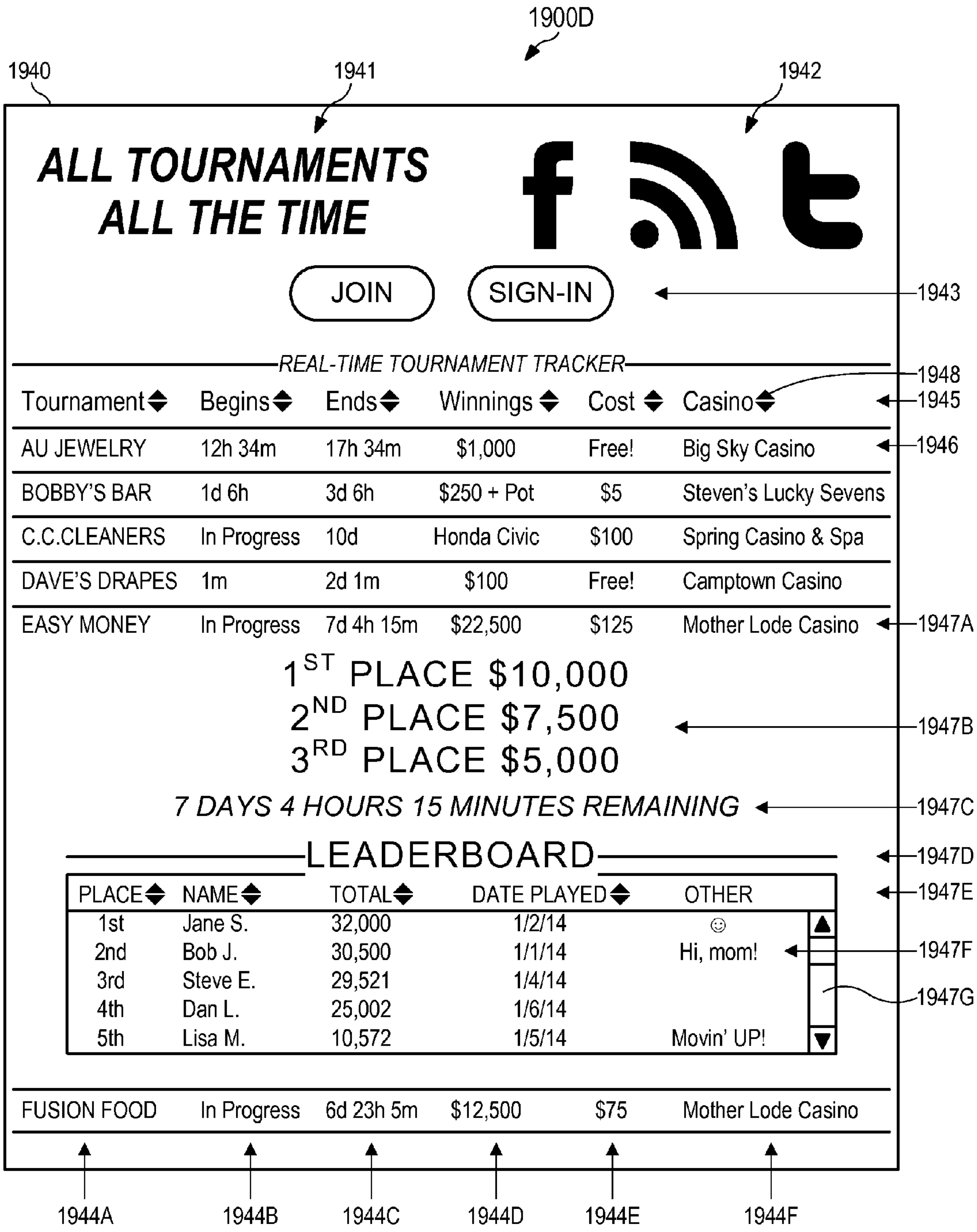
FIG. 19D is another illustration of displaying one or more skill-based game play data, according to one embodiment.

In FIG. 19D, another illustration of a display utilized in tournament play is shown, according to one embodiment. A fourth image 1940 may include tournament areas 1941, one or more links 1942, one or more join areas 1943, one or more tournament information scrolls 1945, one or more scrollers 1948, one or more tournaments details 1946, a detailed tournament area 1947A, a detailed payout structure 1947B, a detailed tournament remaining period 1947C, a detailed leaderboard 1947D, one or more leaderboard data 1947F, a leaderboard scroll 1947G, a tournament name area 1944A, a tournament status 1944B, a tournament remaining period 1944C, a tournament prize area 1944D, a tournament entry fee 1944E, and one or more tournament location 1944F.

Tournament areas 1941 may include data relating to one or more tournament titles, one or more tournament structures, and/or any other information relating to one or more tournaments.

One or more links 1942 may include links to one or more general social sites (e.g., Facebook, Twitter, etc.), one or more sporting events (e.g. ESPN, etc.), one or more casino specific social sites, etc. One or more join areas 1943 may include a join link, a sign-in button, a sign-off button, etc.

One or more tournament information scrolls 1945 may show high-level information relating to one or more tournaments where a user can select one or more of these tournaments to obtain more detailed information relating to the one or more tournaments. One or more scrollers 1948 may allow a user to scroll up and/or down a list of tournaments. One or more tournaments details 1946 may include tournament data, such as, the tournament name, when the tournament begins, when the tournament ends, the prize structure, the tournament entry fee, the tournament location, one or more venues to enter (e.g., mobile device, mobile application, satellite locations, etc.), and/or any other tournament data.

Detailed tournament area 1947A may include more tournament data, such as tournament name area 1944A, the leaderboard (e.g., detailed leaderboard 1947D), a detailed prize structure (e.g., tournament prize area 1944D and/or detailed payout structure 1947B), the tournament players, the tournament leaders (e.g., one or more leaderboard data 1947F), one or more entry times, the last entry time, the entry fee (e.g., tournament entry fee 1944E), the length of the tournament, the remaining tournament time (e.g., tournament remaining period 1944C and/or detailed tournament remaining period 1947C), tournament status 1944B, one or more tournament venues (e.g., one or more tournament locations 1944F), and/or any other tournament data, which may be accessed via leaderboard scroll 1947G.

In one example, when groups participate, the performance of individual members might be awarded differently based on a variety of metrics such as, fastest member (most plays), luckiest member (best win ratio), first to enter score, etc. In various examples, the tournament structure may allow individuals to compete against individuals, teams to compete against individuals, and/or teams to compete against teams.

Figure 19E:
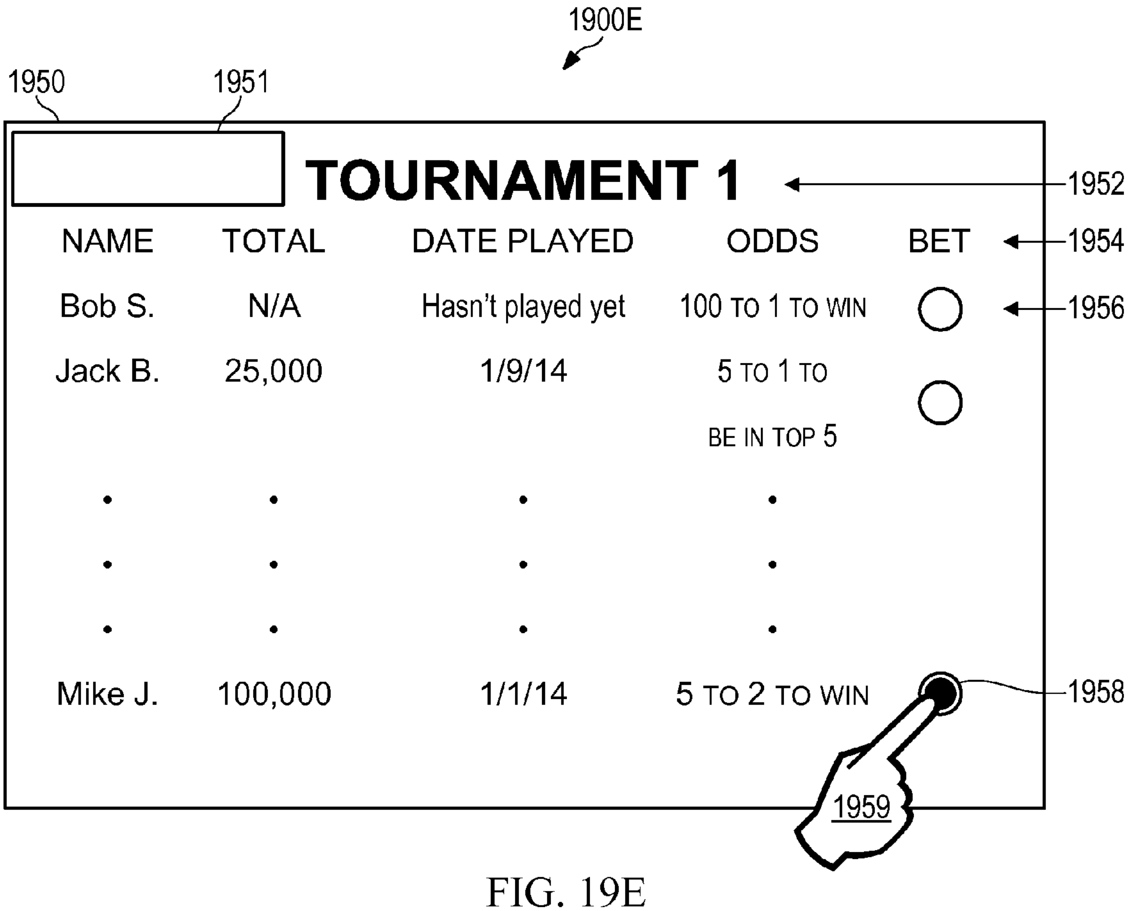
FIG. 19E is another illustration of displaying one or more skill-based game play data, according to one embodiment.

In FIG. 19E, an illustration of one or more side-betting options utilized in asynchronous tournament play is shown, according to one embodiment. A fifth image 1950 may include a tournament title area 1952, one or more side-bet criteria 1954, one or more side-bet options 1956, a selected side-bet 1958, and a sixth advertisement area 1951.

Tournament title area 1952 may include data relating to one or more tournament titles. One or more side-bet criteria 1954 may include the name of the person and/or team relating to the side-bet, the scores for one or more players and/or teams, the status for one or more players and/or teams, the side-bet odds, and a side-bet button (e.g., one or more side-bet options 1956) to indicate a side bet (e.g., selected side-bet 1958).

In this example, the management system may allow for side-betting on the results of the tournament. Also, the management system may allow for tournament participants to be groups where an all-group tournament could be scored based on group total scores. Conversely, groups and individuals could participate in a tournament together where, groups compete with their collective average against individual scores (see FIG. 19F). The management system may award individual tournament participants and/or group participants for similar metrics. Further, individual tournament participants and/or group participants may compete against each other.

Sixth advertisement area 1951 may include one or more advertisements and/or sponsor data. In one example, the one or more advertisements may offer a buy one get one free advertisement (e.g., shows, food, entertainment, lodging, etc.). In another example, the advertisement may be a free offer, a percentage off offer, and/or any other advertisement offering. In another example, the advertisements and/or sponsor data may be based on player preferences, player data, player demographics, and/or any other customizable data. In another example, the advertisements and/or sponsor data may be displayed at a first tournament time (e.g., beginning), at a second tournament time (e.g., a break period), at a third tournament time (e.g., 10 minutes into the tournament), at a fourth tournament time (e.g., at the end), and/or any other time period. Further, the advertisement and/or sponsor data may be related to any theme, promotion, a special event, and/or any other item.

In FIG. 19F, another illustration of a display utilized in tournament play is shown, according to one embodiment. A sixth image 1960 may include one or more team and/or individual criteria area 1962, a first team data area 1964, a first individual player area 1966, and an Nth team data area 1968.

One or more team and/or individual criteria area 1962 may include a name category, a score category, a date category, a status category, and/or an average score category. First team data area 1964 may include the first team's name, the first team's total score, the first team's playing history in this tournament, the first team's status, and/or the first team's average score. First individual player area 1966 may include the individual's name, the individual's score, the individual's history in this tournament, the individual's status, and the individual average score. Nth team data area 1968 may include the Nth team's name, the Nth team's total score, the Nth team's playing history in this tournament, the Nth team's status, and/or the Nth team's average score. In one example, an individual may compete against a team by comparing the average scores for both the individual and the team to determine a winner.

In another example, when one or more individuals and/or one or more groups compete against each other, a group's score may be determined by the team average. In another example, the group's score may be determined by averaging the players' scores, unless the player's score is zero, in which case the zero score may be excluded when determining the group's average score. For example, a group of four players where a first player's score is 100,000; a second player's score is 50,000; a third player's score is 150,000; and a fourth player's score is 0, then the group's average would be 100,000 (e.g., 100,000+50,000+150,000 divided by 3). In another example, the group's average may include one or more player scores that are zero. For example, a group of four players where a first player's score is 100,000; a second player's score is 50,000; a third player's score is 150,000; and a fourth player's score is 0, then the group's average would be 75,000 (e.g., 100,000+50,000+150,000 divided by 4).

Figure 20:
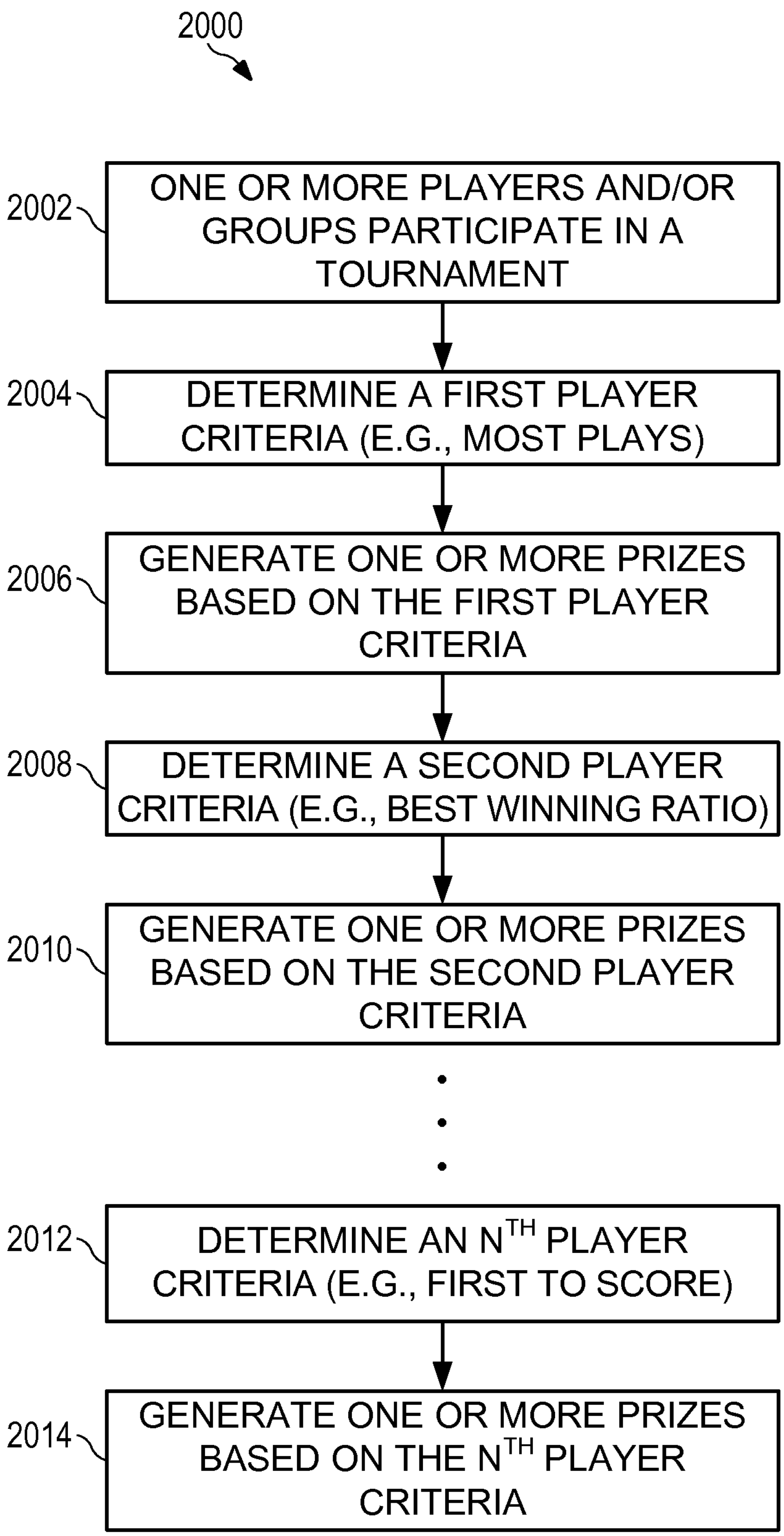
FIG. 20 is a flow diagram for skill-based game play, according to one embodiment.

In FIG. 20, another flow diagram of asynchronous tournament play is shown, according to one embodiment. The method may include one or more players and/or one or more groups (e.g., teams) participating in one or more tournaments (e.g., step 2002). The method may include determining a first player criteria and/or first tournament criteria (step 2004). In one example, the first player criteria and/or first tournament criteria may be the most plays (e.g., fastest player). In another example, the first player criteria and/or first tournament criteria may be least plays (e.g., slowest player). In another example, the first player criteria and/or first tournament criteria may be the first to win a specific prize on a spin—the first player to win 1,000 credits, the first player to win 100 credits twice, the first player to win 10 free spins, the first player to win 500 credits with a 2× multiplier, the first player to win 1,000 credits, 5 free spins, and a scatter bonus, etc. The method may include generating one or more prizes based on the first player criteria and/or the first tournament criteria (step 2006). In various examples, any prize and/or item of value may be generated for achieving the first player criteria and/or the first tournament criteria. Various examples include money (e.g., $50, $100, etc.), free play, free future tournament entry, free current tournament entry, free hotel room, free food, free entertainment, any item of value (e.g., car, iPhone, iPad, etc.), and/or any combination thereof. The method may include determining second player criteria and/or second tournament criteria (step 2008). In one example, the second player criteria and/or the second tournament criteria may be a best winning ratio. The best winning ratio may be the ratio of winning spins versus completed spins. The method may include generating one or more prizes based on the second player criteria and/or the second tournament criteria (step 2010). The method may include determining an Nth player criteria and/or an Nth tournament criteria (step 2012). In one example, the Nth player criteria and/or the Nth tournament criteria may be a first to score criteria. The method may include generating one or more prizes based on the Nth player criteria and/or the Nth tournament criteria (step 2014). It should be noted that all of these player criteria may be utilized as team criteria. For example, the first team criteria and/or first tournament criteria may be the most plays by a team (e.g., fastest players). In another example, the first team criteria and/or first tournament criteria may be least plays by a team (e.g., slowest players). In another example, the first team criteria and/or first tournament criteria may be the first team to win a specific prize on a spin—the first team to win 1,000 credits, the first team to win 100 credits twice, the first team to win 10 free spins, the first team to win 500 credits with a 2× multiplier, the first team to win 1,000 credits, 5 free spins, and a scatter bonus, etc. In various examples, any prize and/or item of value may be generated for achieving the player criteria, the team criteria, and/or the tournament criteria. Various examples include money (e.g., $50, $100, etc.), free play, free future tournament entry, free current tournament entry, free hotel room, free food, free entertainment, any item of value (e.g., car, iPhone, iPad, etc.), and/or any combination thereof. In another example, the player may be awarded a voucher, such as, a "Golden Ticket."

To manage such large tournaments, game bracketing, in various formats may be supported as well. For instance, a single and/or double elimination bracket format might be applied to the tournament to extend the competition, allow another chance to avoid the single unlucky game factor, and appropriately manage much larger groups of participants.

Figure 21:
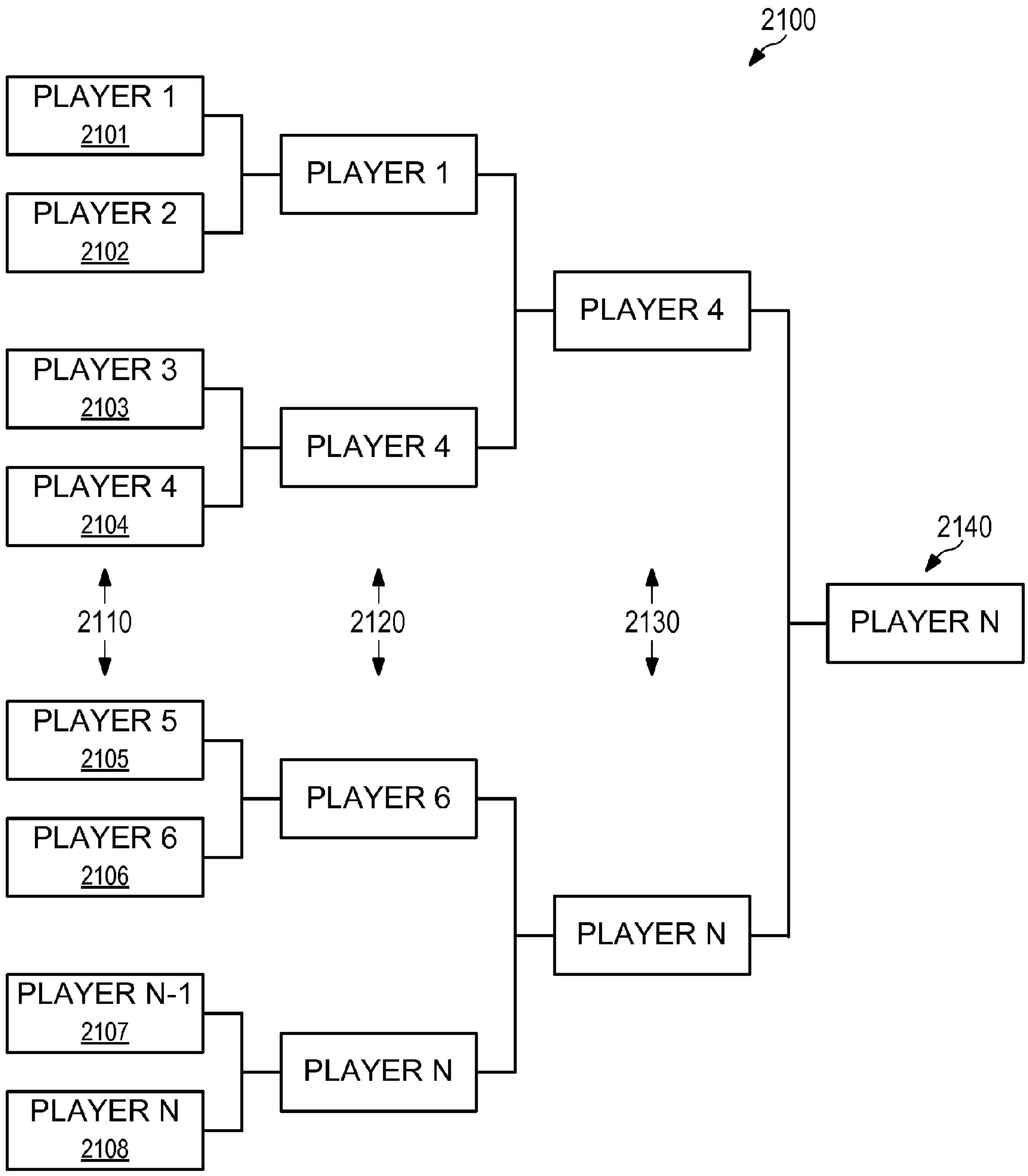
FIG. 21 is a flow diagram for skill-based game play, according to one embodiment.

In FIG. 21, another flow diagram of tournament play 2100 is shown, according to one embodiment. In this example, a tournament bracket is shown were a first player 2101, a second player 2102, a third player 2103, a fourth player 2104, a fifth player 2105, a sixth player 2106, an N−1 player 2107, and an N player 2108 compete in a first bracket 2110. In this example, the winner of each match (e.g., first player 2101 versus second player 2102, third player 2103 versus fourth player 2104, fifth player 2105 versus sixth player 2106, N−1 player 2107 versus N player 2108) moves onto a second bracket 2120. In this example, the winner of each match (e.g., first player 2101 versus fourth player 2104 and sixth player 2106 versus N player 2108) in second bracket moves onto a third bracket 2130 where the winner of this match is a tournament winner 2140 (e.g., N player 2108). In should be noted that any number (e.g., 1 to N) of players, any number (e.g., 1 to N) of matches, and/or any number (e.g., 1 to N) of brackets may be utilized. The above referenced examples may also be utilized with a first team, a second team, a third team, etc.

Figure 22:
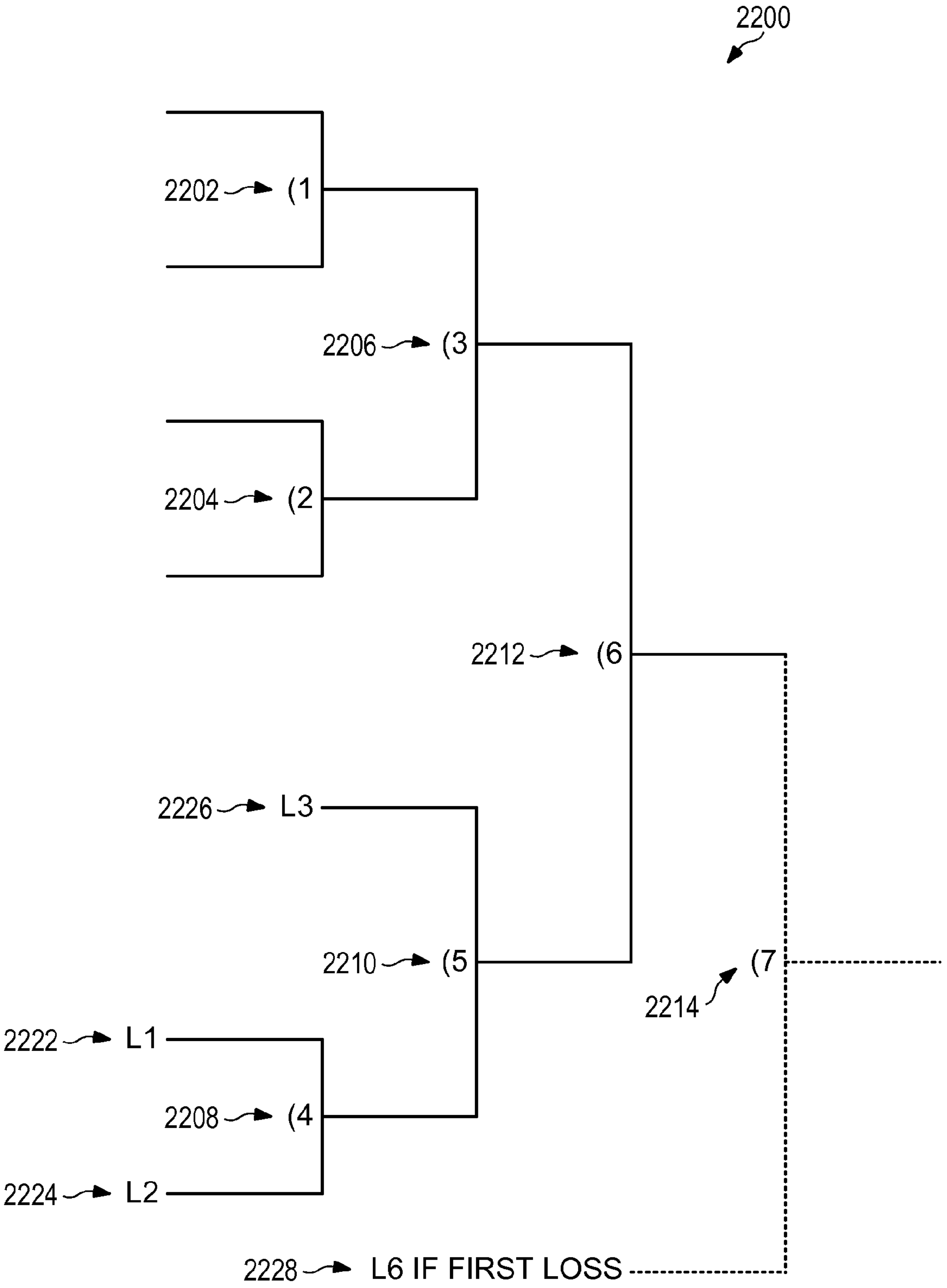
FIG. 22 is a flow diagram for skill-based game play, according to one embodiment.

In FIG. 22, another flow diagram of tournament play 2200 is shown, according to one embodiment. In this example, a double elimination bracket system is utilized. In this example, the tournament play is a double elimination style where a player is eliminated once the player loses two matches. This method may include a first player and a second player competing in a first match 2202. The winner of the first match 2202 moves onto a third match 2206. The loser of the first match 2202 moves onto a fourth match 2208. The method further includes a third player and a fourth player competing in a second match 2204. The winner of the second match 2204 moves onto third match 2206 while the loser of the second match 2204 moves onto fourth match 2208. The loser of the fourth match 2208 is eliminated from the tournament because this player has lost twice. In this case, the player has either lost in first match 2202 or second match 2204 and has now lost again in fourth match 2208. The winner of fourth match 2208 moves onto a fifth match 2210 to play the loser of third match 2206. The winner of fifth match 2210 will play the winner of third match 2206 in a sixth match 2212. This method continues (e.g., a seventh match 2214, etc.) until all of the players except one has two loses. The above referenced examples may also be utilized with a first team, a second team, a third team, etc.

Figure 23:
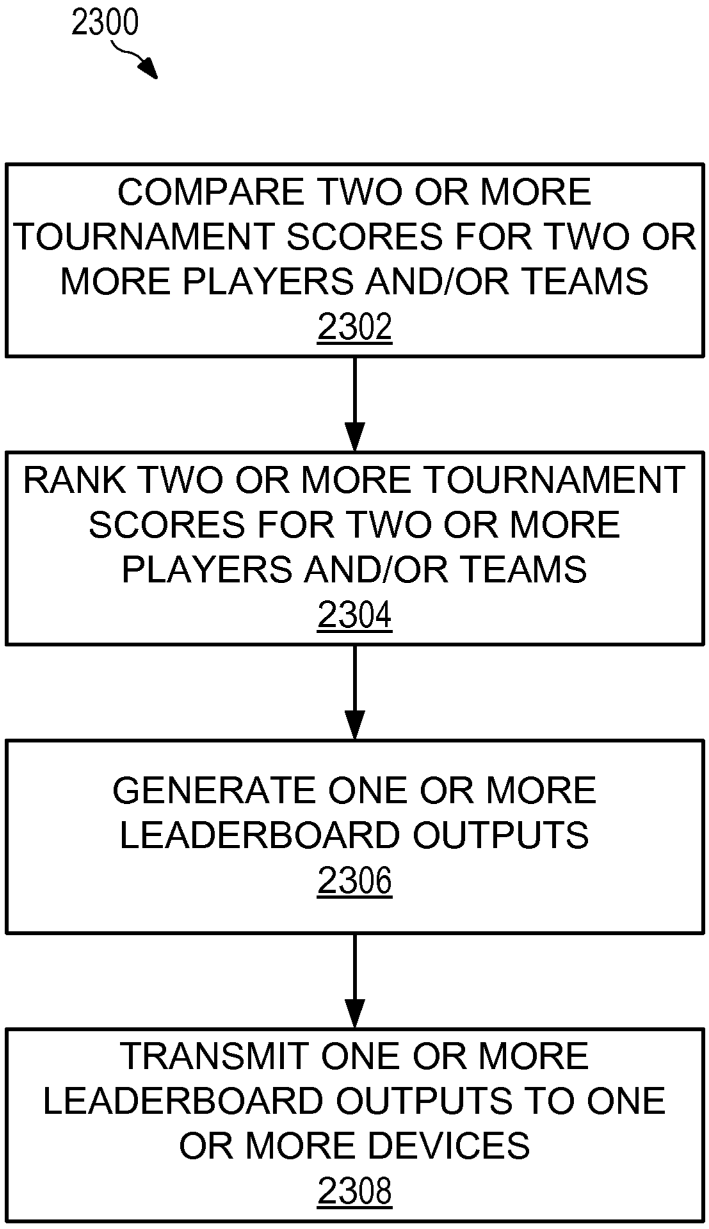
FIG. 23 is a flow diagram for skill-based game play, according to one embodiment.

In FIG. 23, another flow diagram of tournament play 2300 is shown, according to one embodiment. The method may include comparing two or more tournament scores for two or more players and/or two or more teams (step 2302). The method may include ranking two or more tournament scores for two or more players and/or two or more teams (step 2304). The method may include generating one or more leaderboard outputs (step 2306). The method may include transmitting one or more leaderboard outputs to one or more devices (step 2308). The method may include displaying one or more leaderboard outputs. For example, the leaderboard information may be displayed on an exterior display to promote one or more tournaments to the public. In another example, the leaderboard information may be displayed on an interior display to promote one or more tournaments to casino players. In another example, the leaderboard information may be displayed on an Internet site to promote one or more tournaments. In another example, the leaderboard information may be displayed on one or more gaming devices to promote the one or more tournaments and/or to update tournament participants on the tournament status.

Figure 24:
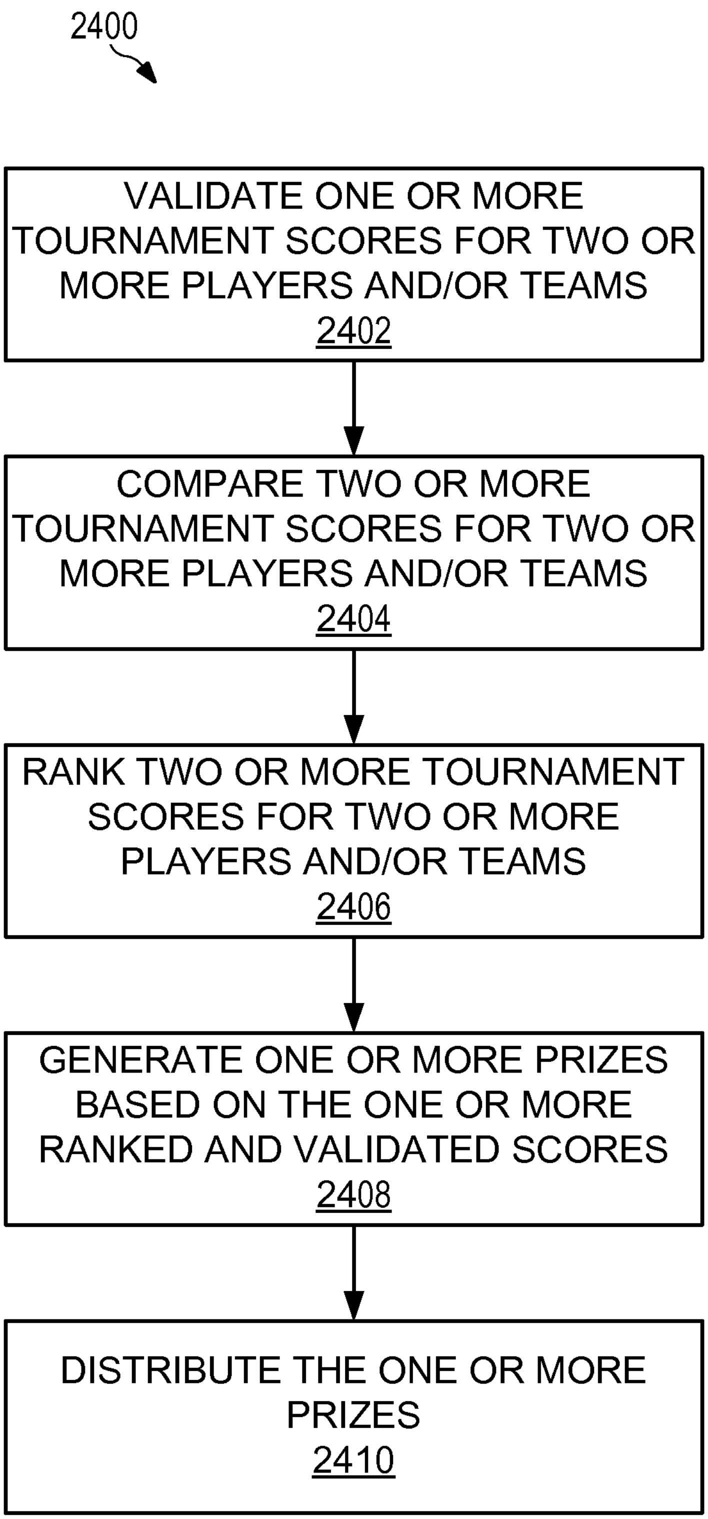
FIG. 24 is a flow diagram for skill-based game play, according to one embodiment.

In FIG. 24, another flow diagram of tournament play 2400 is shown, according to one embodiment. The method may include validating (e.g., compare tournament data to a secure source to validate the tournament data) one or more tournament scores for two or more players and/or two or more teams (step 2402). The method may include comparing two or more tournament scores for two or more players and/or two or more teams (step 2404). The method may include ranking two or more tournament scores for two or more players and/or two or more teams (step 2406). The method may include generating one or more prizes based on the one or more ranked and validated scores (step 2408). The method may include distributing the one or more prizes (step 2410).

In another example, casino gaming tournaments may be greatly enhanced by using a skill-based game as the game being played by the competitors. Further, a skill game could be used in various ways. In one way, the tournament may solely be based on one or more skill-based games. In addition, skill-based tournament play may be used to enhance the solely random slot-type game. In this example, the user plays the slot game and a second screen (or a side game) is skill-based to enhance the excitement of the tournament. Further, the skill element may be used in a tiered way to allow for a tournament where several rounds are played; one a slot-type round; and two different skill-based rounds; and/or any other combination of rounds. In addition, the skill-based game play may be utilized to determine whether one or more players have qualified for one or more tournaments. In other words, the skill-based game play would be utilized to determine which players may play in one or more tournaments. These players may be automatically registered for one or more tournaments based on their qualification scores.

In another example, the system and/or method may include enabling one or more multi-site tournament aspects. In one example, one or more tournaments may be held across multiple casinos either at the same time or asynchronously. In the asynchronous case, the system and/or method may add multiple casino tournament management servers in the event. In the simultaneous case, tournament management servers from different, participating, sites may connect and wait for either: a predetermined start time; a pre-designated 'master' casino of the group to press the start button; and/or each participating casino may each have to press their own start buttons to begin the tournament. In various examples, group playing and side-betting enhancement options may be applied to the simultaneous tournament play. In addition, some additional forms of winner can happen here, i.e., winning casino of the group by average score, total score for a fixed-size tournament such as 20 players per casino required, etc. There may also be a local winner for each casino in addition to an overall winner across all casinos.

In another example, the system and/or method may print leaderboard information on a ticket. The Tournament system may print a 'receipt' using the voucher printer for each participant with their results. In another example, a leaderboard playback, showing the last 10 seconds, for example, of the leaderboard in motion may be utilized by the system and/or method. In addition, the winner's facial expressions obtained via camera 120 or 312 may be utilized by the leaderboard functionality and/or any other functionality.

In another example, a player registration process may be utilized. In one example, the system and/or method may utilize a player self-register. For instance, the game is in a non-tournament mode (e.g. revenue mode), the player comes up to it, is identified, and can either, validate their previously attained registration when they are ready to play in the tourney, or, they could register right at the game and begin. Once the player is finished, the game may go right back to revenue mode. Thus, reducing the 'down' time of the game and reducing the operations effort of the casino registering players and linking them with games.

One or more tournament presentations may be based on a first theme (e.g., pirates), a second theme (e.g., cars), a third theme (e.g., horses), a fourth theme (e.g., perceived skill), a fifth theme (e.g., a specific movie), a sixth theme (e.g., a sporting event), a seventh theme (e.g., outer space), an eight theme (e.g., flowers), a ninth theme (e.g., food), a tenth theme (e.g., a skill-based presentation), an eleventh theme (e.g., trivia), a twelve theme (e.g., pick a bonus), a thirteenth theme (e.g., ghost), a fourteenth theme (e.g., natural events), on a fifteenth theme (e.g., a mineral—gold, silver, etc.), and/or a sixteenth theme (e.g., mythology). One, a few, a plurality, and/or all of these presentations may be themed based.

In another embodiment, the method of providing gaming options via an electronic gaming device may include receiving one or more primary wagers on one or more paylines, starting a bonus game, determining one or more values, and/or selecting one or more presentations based on the one or more values.

In an exemplary embodiment, an electronic gaming device may include a plurality of reels. The plurality of reels may include a plurality of symbols. The electronic gaming device may include a first payline, a second payline, and a memory. The memory may include a payline module. The payline module may include a plurality of payline structures. The electronic gaming device may include a processor. The processor may receive primary wagers on one or more paylines. The processor may receive one or more secondary wagers on one or more selected paylines (e.g., repeat paylines, patterns, scenarios, etc.). The selected paylines may be based on data received from a player. The processor may determine a selected payline's payout based on the one or more selected paylines (e.g., repeat paylines, patterns, scenarios, etc.).

In another embodiment, the processor may determine a payout based on the primary wagers. The electronic gaming device may include a network interface, which may receive data from at least one of a server and one or more gaming devices. The electronic gaming device may include a display, which may display one or more selected paylines.

In another example, the display may shade one or more non-selected paylines. The electronic gaming device may include a player preference input device. The player preference input device may modify a game configuration based on data from an identification device. The processor may multiply a prize value based on a selected payline occurrence.

In another example, the method may include displaying a game status image. The method may also include shading one or more completed objectives (e.g., tournament level selecting any element, obtaining a repeat payline, etc.).

In another embodiment, the electronic gaming system may include a server. The server may include a server memory, a server processor, and a signage server. The server memory may include historical gaming data. The server processor may generate a gaming message based on the historical gaming data. The signage server may transmit the gaming message.

In another example, the gaming message may be transmitted to an internal display of a gaming entity. The internal display may be a non-gaming device display. The gaming message may be transmitted to an external display of a gaming entity. The external display may be located outside of a gaming entity. The gaming message may be transmitted to at least one of a top display, a main display, and a side display.

The plurality of reels may form a 5-by-5 matrix, a 3-by-5 matrix, a 4-by-5 matrix, a 4-by-3 matrix, a 5-by-3 matrix, or any number-by-any number matrix. The symbols may be an image of a card, an image, and/or other objects. For example, it could be a pot of gold, an ace of spades, a diamond, or any other symbol. The symbols may be an animation. The symbols may be a picture. For example, it may be a picture of the player as taken by camera 312. The symbols may be a number. The symbols may be any image. The symbols may be blank.

The disclosed features may be part of the base game, a bonus game, and/or tournament game play. In addition, the disclosed features may be part of a base bet and/or may require an additional side bet (e.g., ante bet).

In one embodiment, the electronic gaming device may include a plurality of reels, a memory, and one or more processors. One or more paylines may be formed on at least a portion of the plurality of reels. The memory may include one or more tournament game structures with one or more skill-based tournament game play structures. The one or more processors may initiate the one or more tournaments based on one or more tournament game structures. The one or more tournaments may be at least based in part on one or more skill-based tournament game plays.

In another example, the memory may further include one or more skill-based tournament entry structures. In an example, the one or more processors may initiate one or more skill-based tournament entry games based on one or more skill-based tournament entry structures. In one example, the one or more processors may register one or more players based on one or more scores in the one or more skill-based tournament entry games. In another example, the one or more processors may register a first group of players in a first tournament based on each of the players in the first group of players obtaining a first scoring criteria. Further, the one or more processors may register a second group of players in a second tournament based on each of the players in the second group of players obtaining a second scoring criteria. In addition, the first scoring criteria may be higher than the second scoring criteria. In other words, one group of players may qualify for a higher prize tournament based on their higher scores than players that have lower scores. In another example, the one or more processors may rank one or more players based on a slot-type tournament game play and a skill-type tournament game play. In one example, the one or more processors may generate one or more prizes based on the one or more rankings. In addition, a first tournament may include a first slot-type gaming round, a first skill-type gaming round, a second slot-type gaming round, a second skill-type gaming round, an Nth slot-type gaming round, and/or an Nth skill-type gaming round.

In another embodiment, the method of providing tournament gaming options via an electronic gaming device may include: starting one or more tournaments; initiating a first slot-type tournament gaming round; and/or initiating a first skill-type tournament gaming round.

In another example, the method may further include ranking one or more players based on one or more first slot-type tournament gaming round scores and one or more first skill-type tournament gaming round scores. In one example, the method may further include generating one or more prizes based on the one or more rankings. In another example, the method may further include initiating a second slot-type tournament gaming round and a second skill-type tournament gaming round. In addition, the method may include determining one or more players to move onto at least one of a second slot-type tournament gaming round and/or a second skill-type tournament gaming round based on each players' score in the first slot-type tournament gaming round and the first skill-type tournament gaming round.

In another embodiment, the electronic gaming system may include a server. The server may include a server memory and a server processor. The server memory may include one or more tournament game structures with one or more skill-based tournament game play structures. The server processor may initiate the one or more tournaments based on one or more tournament game structures where the one or more tournaments are at least based in part on one or more skill-based tournament game plays.

In another example, the server memory may include one or more skill-based tournament entry structures. In addition, the server processor may initiate one or more skill-based tournament entry games based on one or more skill-based tournament entry structures. The server processor may register one or more players based on one or more scores in the one or more skill-based tournament entry games. In another example, the server processor may register a first group of players in a first tournament based on each of the players in the first group of players obtaining a first scoring criteria.

In various examples, the skill-based games may have different levels of difficult. For example, a first skill-based game type may be a leisure type game (e.g., Catch a symbol, move a symbol to a location, etc.). In another example, a second skill-based game type may be a strategy type game (e.g., Chess, war battles where you put your playing pieces in strategic locations, etc.). In another example, a third skill-based game type may be a hitting a target type game (e.g., bow and arrow aiming at a bulls eye, darts, etc.). In another example, a fourth skill-based game type may combine any of the previous types. For example, a strategy game where you set-up playing pieces and then utilize an aiming function to target one or more enemies.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:

a credit device configured to accept an item associated with a monetary value;

a user input device configured to enable a player to select a wager amount and initiate a game play where the wager amount is subtracted from a credit balance and where the credit balance being funded at least in part via the credit device;

a plurality of display areas;

one or more paylines formed on at least a portion of the plurality of display areas;

a memory, the memory including one or more tournament game structures with one or more skill-based tournament game play structures; and one or more processors configured to initiate one or more skill-based tournament entry games, determine if at least one player has qualified for a first tournament based upon the outcome of said one or more skill-based tournament entry games, and when a player has qualified, initiate a first tournament having N rounds of game play, where N is 2 or more, wherein at least one of said rounds comprises a slot-type round and at least one of said rounds comprises a skill-based round, including advancing said player to the next round of said tournament when said player successfully completes a round and returning said player to said existing round when said player unsuccessfully completes a round.

2. The electronic gaming device of claim 1, wherein an outcome of said slot-type round is randomly determined and an outcome of said skill-based round is determined at least in part by skill of the player as dependent upon one or more inputs by said player.

3. The electronic gaming device of claim 1, wherein the one or more processors are further configured to qualify said player based on one or more scores in the one or more skill-based tournament entry games.

4. The electronic gaming device of claim 3, wherein the one or more processors are further configured to qualify a first group of players in the first tournament based on each of the players in the first group of players obtaining a first scoring criteria.

5. The electronic gaming device of claim 4, wherein the one or more processors are further configured to qualify a second group of players in a second tournament based on each of the players in the second group of players obtaining a second scoring criteria.

6. The electronic gaming device of claim 5, wherein the first scoring criteria is higher than the second scoring criteria.

7. The electronic gaming device of claim 1, wherein the one or more processors are further configured to rank one or more players based outcomes of said N rounds of game play.

8. The electronic gaming device of claim 7, wherein the one or more processors are further configured to generate one or more prizes based on the one or more rankings.

9. The electronic gaming device of claim 1, wherein the first tournament includes at least a first and a second slot-type round and a first and a second skill-type round.

10. A method of providing tournament gaming options to at least two players via an electronic gaming system comprising a tournament server in communication with at least one electronic gaming device comprising:

qualifying said at least two players in a first tournament when said at least two players each successfully complete a skill-based entry game;

starting, via said tournament server, a first tournament, said first tournament having N rounds where N is at least two and wherein said at least one of said N rounds is a slot-type round wherein an outcome of said round is randomly determined and wherein at least one of said N rounds is a skill-based round wherein an outcome of said round is at least partially determined by a skill of said player based upon at least one input of said player to the electronic gaming device;

initiating a first round of said first tournament at said at least one electronic gaming device and determining an outcome of said first round, wherein if a player is unsuccessful in said first round, returning said player to said first round and wherein if the player is successful in said first round, advancing said player to a second round; and determining a ranking of said at least two players of said first tournament based upon scores of said at least two players in said rounds of said first tournament.

11. The method of claim 10, further comprising generating one or more prizes based on the one or more rankings.

12. The method of claim 10, wherein said first tournament comprises at least a first and a second slot-type round and at least a first and a second skill-type round.

13. An electronic gaming system comprising:

a server including a server memory and a server processor, the server memory including one or more tournament game structures with one or more slot and skill-based tournament game play structures;

the server processor configured to determine if at least a first and a second player have qualified for a first tournament of said one or more tournament game structures based upon qualifying outcomes of one or more skill-based tournament entry games presented to each of said at least one first and second players at at least one electronic gaming device and initiate said first tournament, said first tournament having N rounds presented to said at least a first and second player via said at least one electronic gaming device, where N is two or more and wherein at least one of said rounds comprises a slot-type round having an outcome which is randomly determined and at least one of said rounds comprises a skill-based round having an outcome which is determined at least in part by a skill of the player based upon at least one input to the at least one electronic gaming device, said server processor configured to determine an outcome of said first round, wherein if a player is unsuccessful in said first round, returning said player to said first round and wherein if the player is successful in said first round, advancing said player to a second round and said server processor configured to determine a ranking of said players of said first tournament based upon scores of said players in said rounds of said first tournament;

wherein the electronic gaming device includes a credit device configured to accept an item associated with a monetary value and a user input device configured to enable a player to select a wager amount and initiate a game play where the wager amount is subtracted from a credit balance and where the credit balance being funded at least in part via the credit device during a non-tournament game play mode.

14. The electronic gaming system of claim 13, wherein the server processor is configured to qualify said one or more players based on one or more scores in the one or more skill-based tournament entry games.

15. The electronic gaming system of claim 14, wherein the server processor is further configured to register a first group of players in the first tournament based on each of the players in the first group of players obtaining a first scoring criteria.

* * * * *